(12) United States Patent
O'Connor et al.

(10) Patent No.: US 7,027,683 B2
(45) Date of Patent: Apr. 11, 2006

(54) OPTICAL DEVICES WITH FLUIDIC SYSTEMS

(75) Inventors: Stephen D. O'Connor, Pasadena, CA (US); Eugene Dantsker, Sierra Madre, CA (US); Christoph D. Karp, Pasadena, CA (US)

(73) Assignee: Nanostream, Inc., Pasadena, CA (US)

( * ) Notice: Subject to any disclaimer, the term of this patent is extended or adjusted under 35 U.S.C. 154(b) by 473 days.

(21) Appl. No.: 09/931,585

(22) Filed: Aug. 15, 2001

(65) Prior Publication Data

US 2005/0100270 A1 May 12, 2005

Related U.S. Application Data

(60) Provisional application No. 60/226,174, filed on Aug. 15, 2000.

(51) Int. Cl.
*G02B 6/42* (2006.01)
*G02B 6/26* (2006.01)

(52) U.S. Cl. .............................. 385/19; 385/16; 385/18
(58) Field of Classification Search ............. 385/16–23, 385/140
See application file for complete search history.

(56) References Cited

U.S. PATENT DOCUMENTS

| | | | |
|---|---|---|---|
| 3,641,354 A | 2/1972 | De Ment | 250/216 |
| 3,990,783 A | 11/1976 | Kohashi | |
| 4,079,368 A | 3/1978 | DiStefano | |
| 4,245,886 A | 1/1981 | Kolodzey et al. | |
| 4,270,517 A | 6/1981 | Stephens | 126/422 |
| 4,371,753 A | 2/1983 | Graf | 179/18 |
| 4,505,539 A | 3/1985 | Auracher et al. | |
| 4,583,824 A | 4/1986 | Lea | |
| 4,682,844 A | 7/1987 | Mori | 350/96.15 |
| 4,988,157 A | 1/1991 | Jackel et al. | 350/96.13 |
| 5,104,813 A | 4/1992 | Besemer et al. | 436/179 |
| 5,303,021 A | 4/1994 | Kita | 356/72 |
| 5,408,313 A | 4/1995 | Ponstingl et al. | |
| 5,478,751 A | 12/1995 | Oosta et al. | 436/165 |
| 5,681,484 A | 10/1997 | Zanzucchi et al. | 216/2 |
| 5,698,299 A | 12/1997 | Schmidt et al. | 428/209 |
| 5,726,751 A | 3/1998 | Altendorf et al. | 356/246 |
| 5,771,810 A | 6/1998 | Wolcott | 101/483 |
| 5,838,846 A | 11/1998 | Murdock | 385/16 |
| 5,852,689 A | 12/1998 | Donald | 385/21 |
| 5,863,502 A | 1/1999 | Southgate et al. | 422/58 |
| 5,876,187 A | 3/1999 | Forster et al. | 417/322 |
| 5,900,934 A | 5/1999 | Gilby et al. | 356/344 |

(Continued)

FOREIGN PATENT DOCUMENTS

JP 02 157714 6/1990

(Continued)

OTHER PUBLICATIONS

Gfeller, F., *Bypass Switch for Optical Fiber Ring Network*, "IBM Technical Disclosure Bulletin," vol. 24, No. 3, Aug. 1981, pp. 1493–1495.

(Continued)

*Primary Examiner*—Akm Enayet Ullah
*Assistant Examiner*—Kevin S. Wood
(74) *Attorney, Agent, or Firm*—Vincent K. Gustafson

(57) ABSTRACT

Fluidic systems, including microfluidic systems, are used to manipulate light by light-fluid interaction so as to affect reflection, refraction, absorption, optical filtering, or scattering of the beam. One or more fluids may be provided to a channel or chamber and exposed to an incident beam, and the proportion of at least one of a plurality of fluids may be varied. Light may interact with a discrete fluid plug subject to movement within a channel. One or more flexible members may be employed, such as to provide a variable lens. Fluidic optical devices may be used in applications including optical switching, optical filtering, or optical processing. Multiplexed fluidic optical systems are further provided.

36 Claims, 21 Drawing Sheets

U.S. PATENT DOCUMENTS

| | | | |
|---|---|---|---|
| 5,936,730 A | 8/1999 | Foley et al. | 356/344 |
| 5,960,131 A | 9/1999 | Fouquet et al. | 385/17 |
| 5,972,710 A | 10/1999 | Weigl et al. | 436/34 |
| 6,007,775 A | 12/1999 | Yager | 422/57 |
| 6,037,955 A | 3/2000 | DeBoer et al. | 346/140.1 |
| 6,055,344 A | 4/2000 | Fouquet et al. | 385/16 |
| 6,067,157 A | 5/2000 | Altendorf | 356/337 |
| 6,074,725 A | 6/2000 | Kennedy | 428/188 |
| 6,091,502 A | 7/2000 | Weigl et al. | 356/416 |
| 6,100,541 A | 8/2000 | Nagle et al. | 250/573 |
| 6,154,586 A * | 11/2000 | MacDonald et al. | 385/18 |
| 6,190,034 B1 | 2/2001 | Nielsen et al. | |
| 6,264,892 B1 | 7/2001 | Kaltenbach et al. | |
| 6,274,089 B1 | 8/2001 | Chow et al. | 422/101 |
| 6,307,204 B1 | 10/2001 | Kanomata et al. | |
| 6,360,775 B1 * | 3/2002 | Barth et al. | 137/828 |
| 6,369,893 B1 | 4/2002 | Christel et al. | 356/417 |
| 6,437,345 B1 | 8/2002 | Bruno-Raimondi et al. | 250/458.1 |
| 6,445,845 B1 * | 9/2002 | Sakata et al. | 385/18 |
| 6,470,106 B1 * | 10/2002 | McClelland et al. | 385/16 |
| 6,487,333 B1 * | 11/2002 | Fouquet et al. | 385/18 |
| 6,494,614 B1 | 12/2002 | Bennett et al. | |
| 6,537,506 B1 | 3/2003 | Schwalbe et al. | |
| 6,542,231 B1 | 4/2003 | Garrett | 356/246 |
| 6,547,941 B1 | 4/2003 | Kopf-Sill et al. | 204/452 |
| 6,577,793 B1 * | 6/2003 | Vaganov | 385/52 |
| 6,581,441 B1 | 6/2003 | Paul | |
| 6,585,939 B1 | 7/2003 | Dapprich | 422/99 |
| 6,614,030 B1 | 9/2003 | Maher et al. | 250/458.1 |
| 6,627,446 B1 | 9/2003 | Roach et al. | 436/43 |
| 2002/0008032 A1 | 1/2002 | Hayenga | 204/603 |

FOREIGN PATENT DOCUMENTS

| | | |
|---|---|---|
| JP | 06 175052 | 6/1994 |
| WO | WO 98/45858 | 10/1998 |
| WO | WO 98/45859 | 10/1998 |
| WO | WO 99/19717 | 4/1999 |
| WO | WO 99/44217 | 9/1999 |
| WO | WO 99/60397 | 11/1999 |
| WO | WO 00/25160 | 5/2000 |
| WO | WO 00/39573 | 7/2000 |
| WO | WO 01/32930 | 5/2001 |
| WO | WO 03/037491 A2 | 5/2003 |

OTHER PUBLICATIONS

Taylor, George W., *Electrical Control of Light by Fluid Logic Devices*, "Applied Optics," vol. 12, No. 6, Jun. 1973, pp. 1227–1239.

Quake, Stephen R., et al., *From Micro– to Nanofabrication with Soft Materials*, "Science Magazine," vol. 290, www.sciencemag.org, Nov. 24, 2000.

Mensinger, H., et al., "Microreactor with Integrated Static Mixer and Analysis System," *Micro Total Analysis Systems*, A. van den Berg and P. Bergveld (eds.), 1995 Kluwer Academic Publishers, The Netherlands, pp. 237–243.

Manz, Andreas, et al., *Miniaturization of Separation Techniques Using Planar Chip Technology*, "Journal of High Resolution Chromatography," vol. 16, Jul. 1993.

Chiou, Jeff, et al., "A Closed–Cycle Capillary Polymerase Chain Reaction Machine," Analytical Chemistry, vol. 73, No. 9, pp. 2018–2021, May 1, 2001.

Hecht, Jeff, "Fluid Switching: Optical Networks won't need moving parts, just bubbles," New Scientist, p. 10, Apr. 1, 2000.

Cummings et al., "Dielectrophoretic Trapping Without Embedded Electrodes," Microfluidic Devices and Systems III, Proceedings of SPIE, vol. 4177 (2000).

Waters et al., "Microchip Device for Cell Lysis, Multiplex PCR Amplification, and Electrophoretic Sizing," Analytical Chemistry, vol. 70, No. 1, Jan. 1, 1998.

Lazar et al., "Microchip Integrated Analysis System for Electrospray Mass Spectrometric Analysis of Complex Peptide Mixtures," Micro Total Analysis Systems, 2001, J.M. Ramsey and A. van den Berg (eds.), Kluwer Academic Publishers, the Netherlands.

* cited by examiner

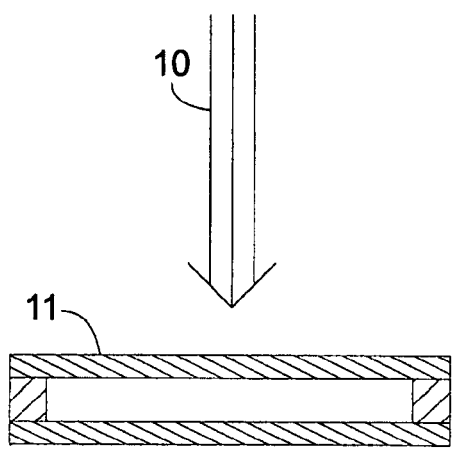
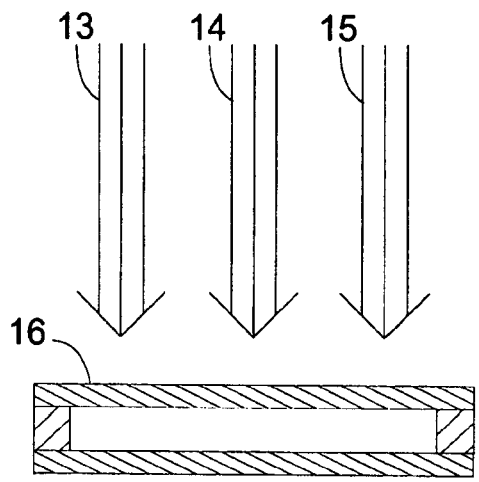
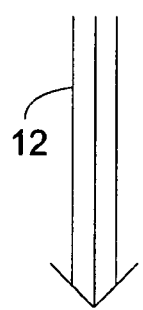
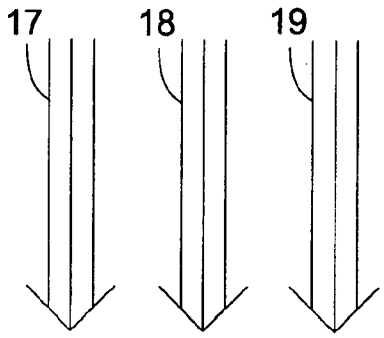
FIG._1A    FIG._1B

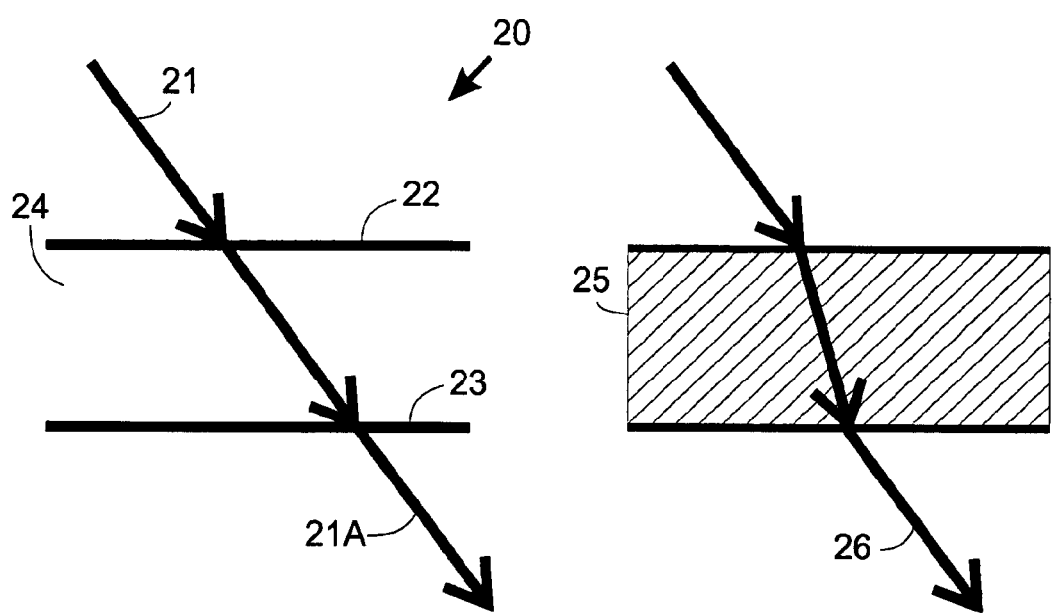
FIG._2A        FIG._2B

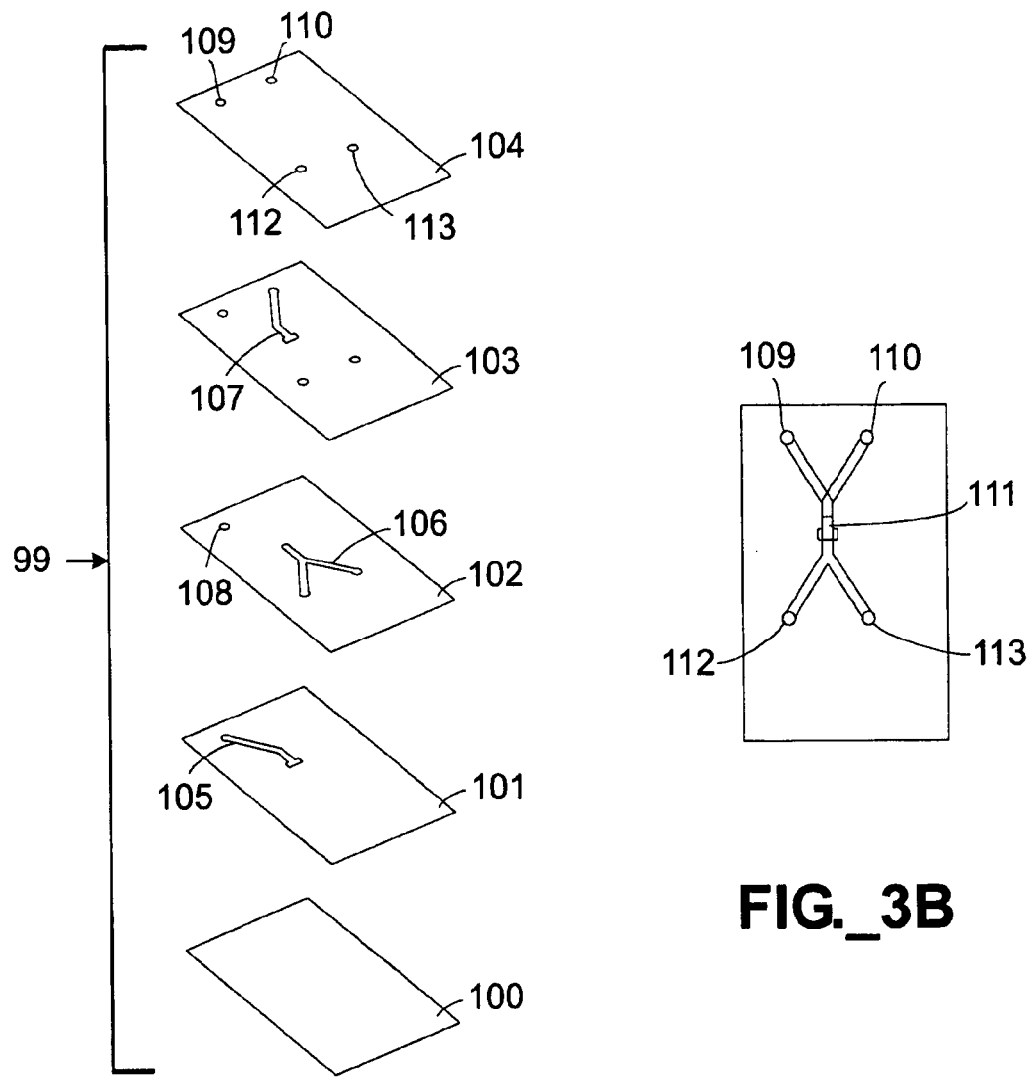
FIG._3A
FIG._3B

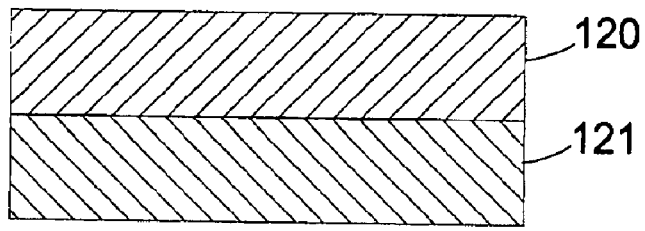
FIG._4A
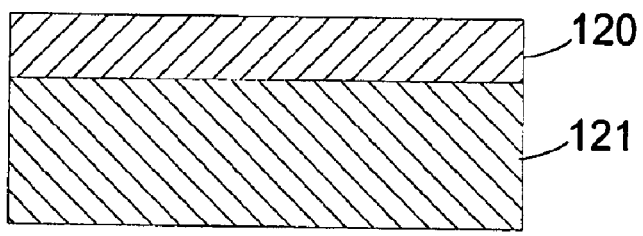
FIG._4B
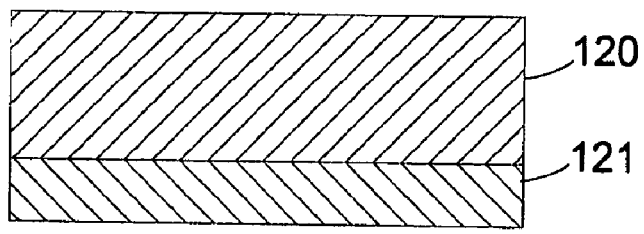
FIG._4C

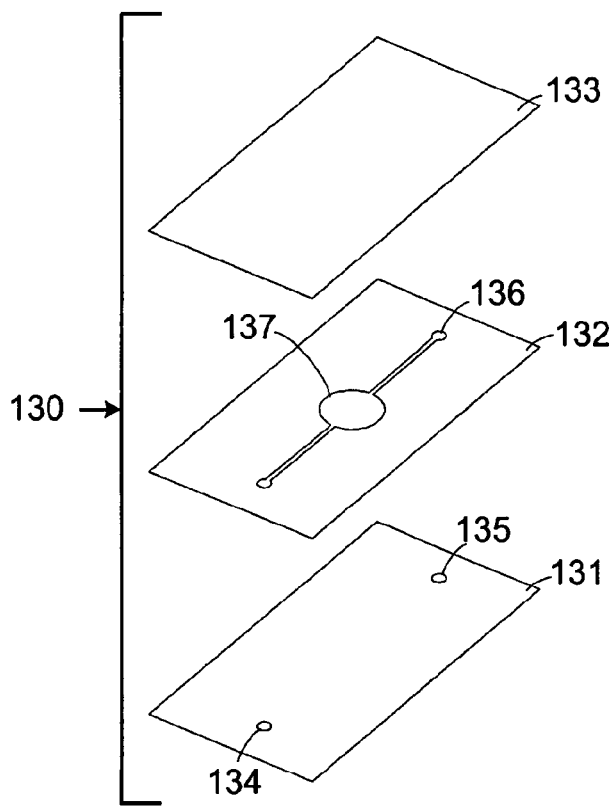
FIG._5A
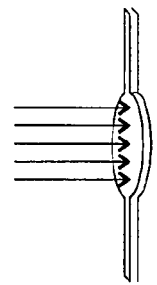
FIG._5C
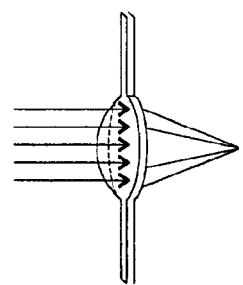
FIG._5D
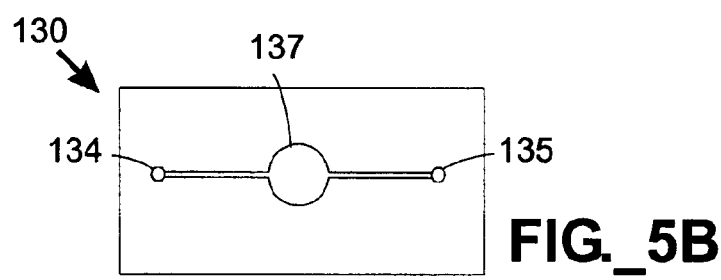
FIG._5B

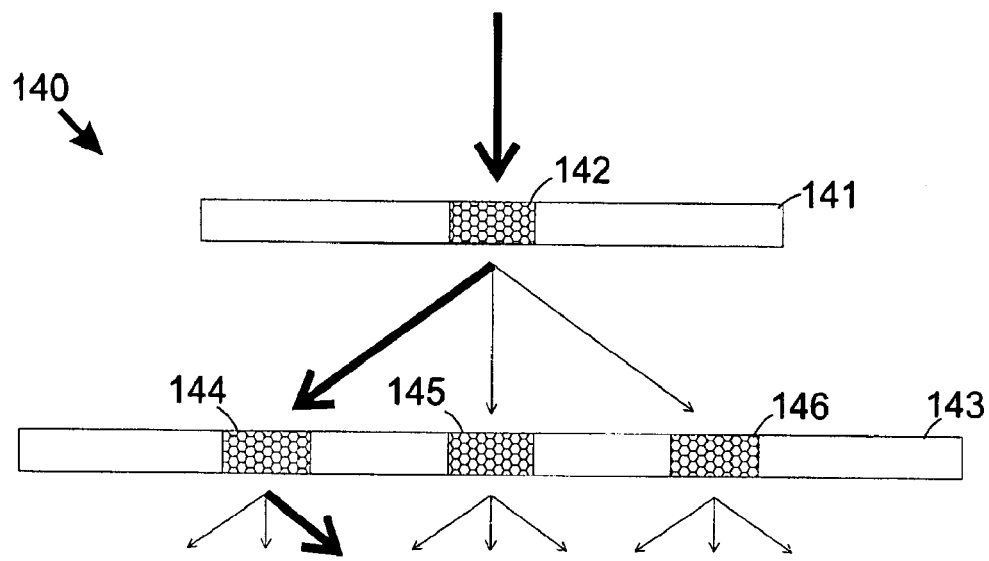
FIG._6A
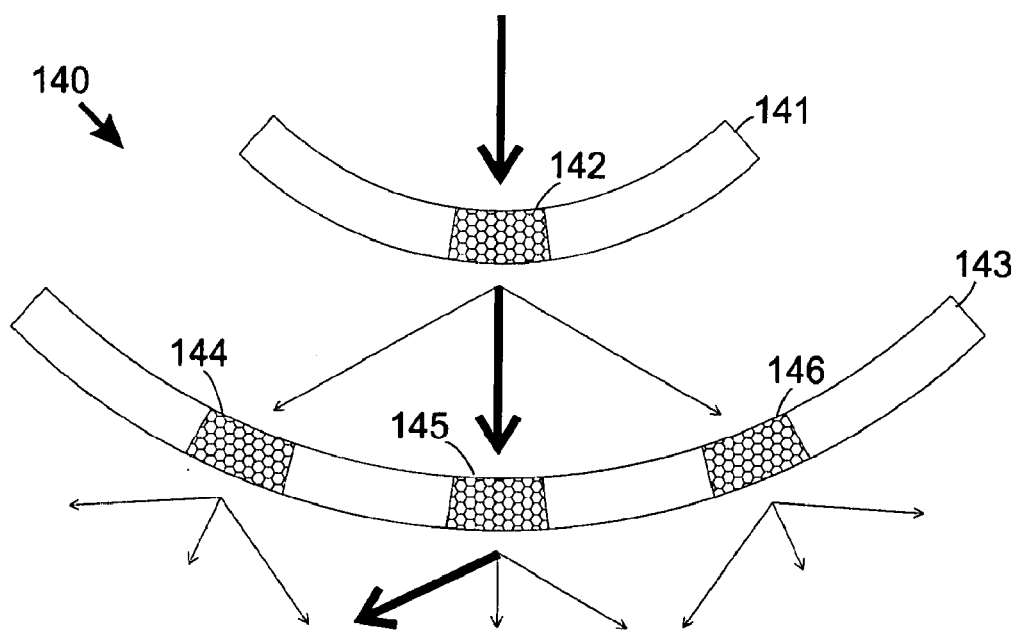
FIG._6B

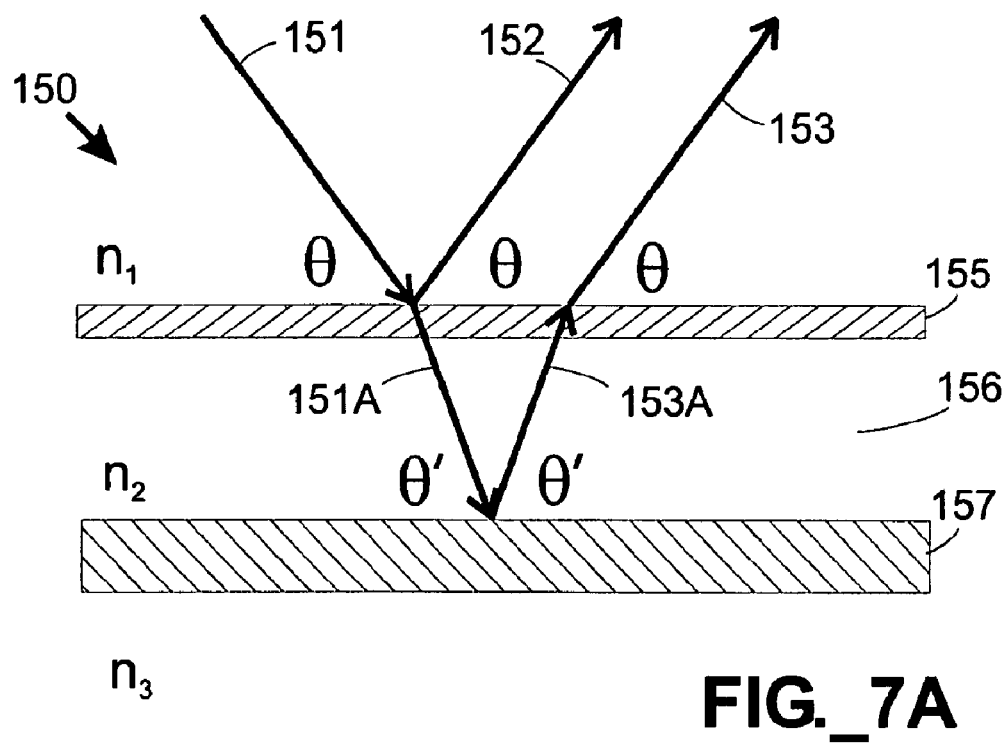
FIG._7A
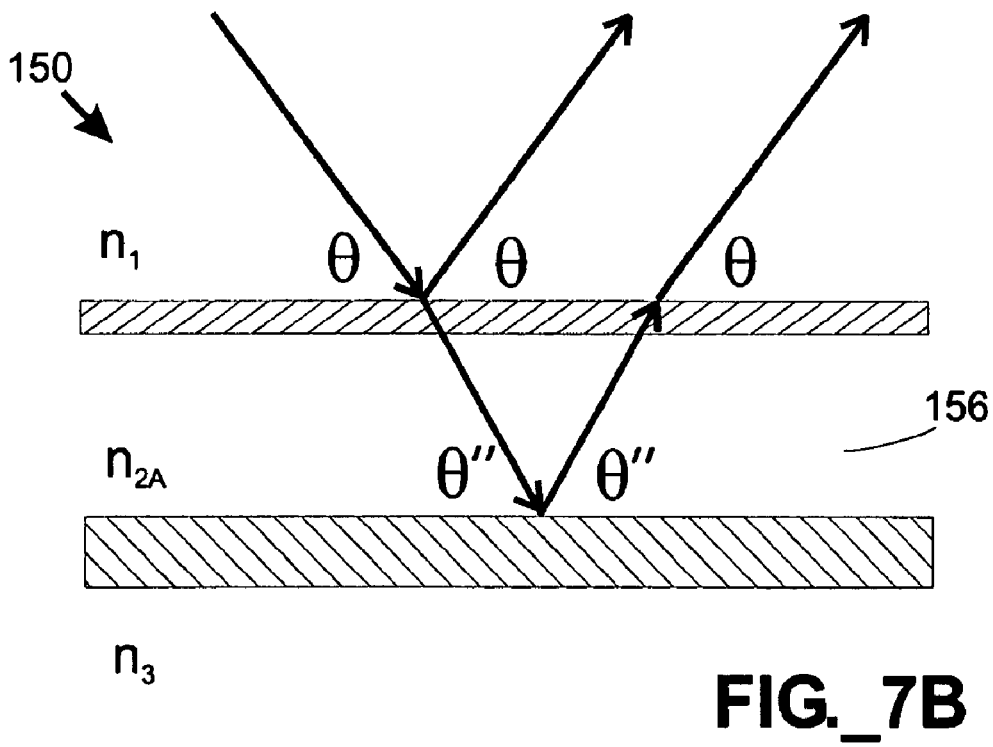
FIG._7B

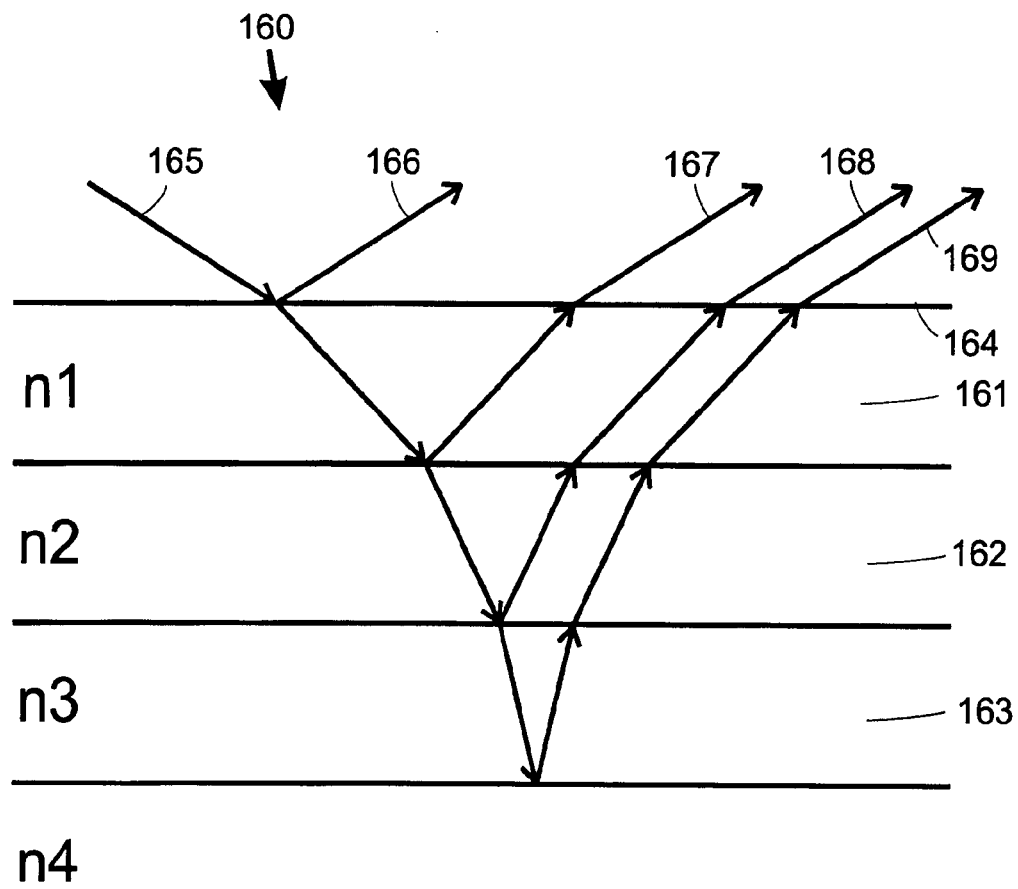
FIG._7C

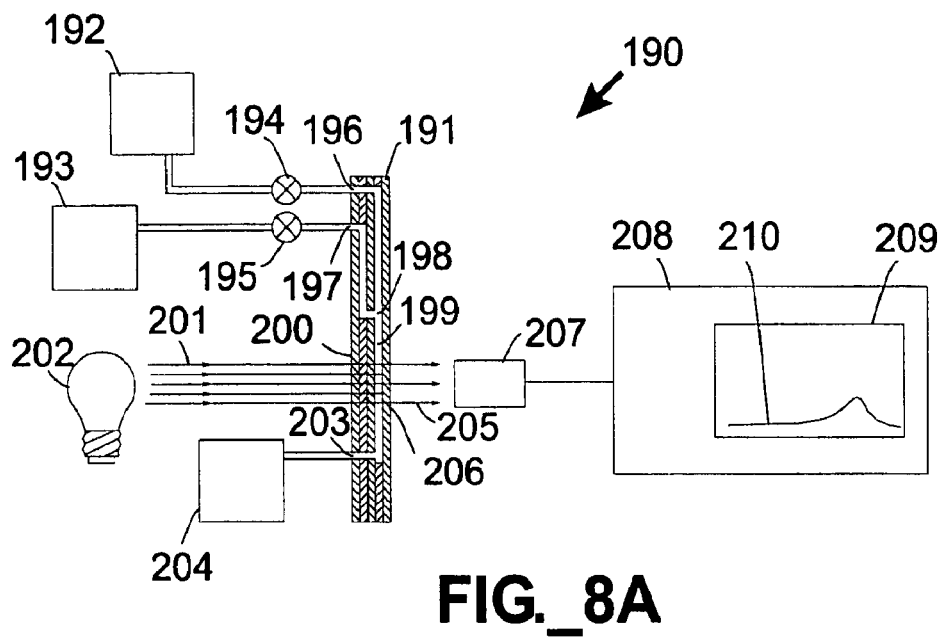
FIG._8A
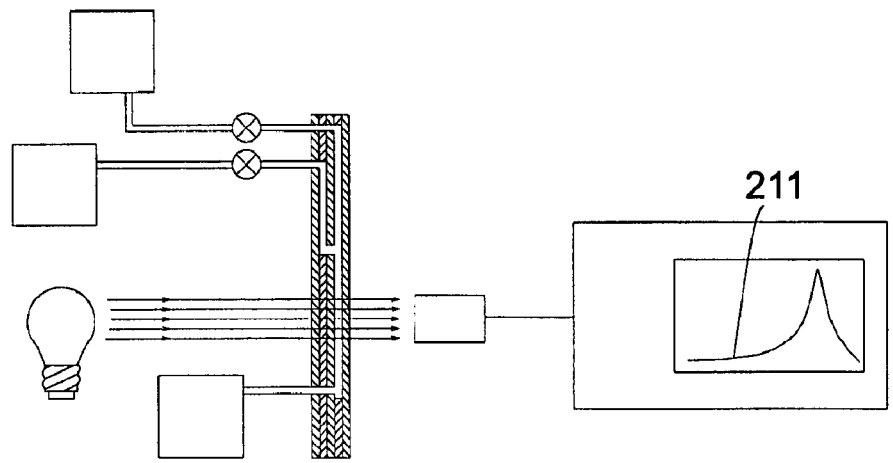
FIG._8B
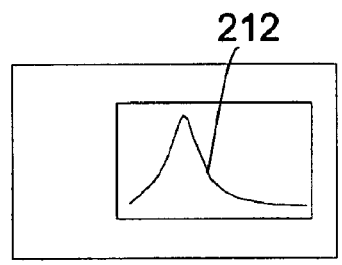
FIG._8C
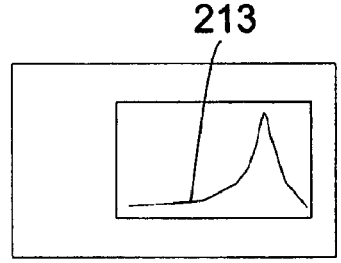
FIG._8D

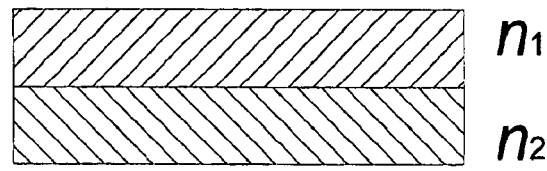
FIG._9A (PRIOR ART)
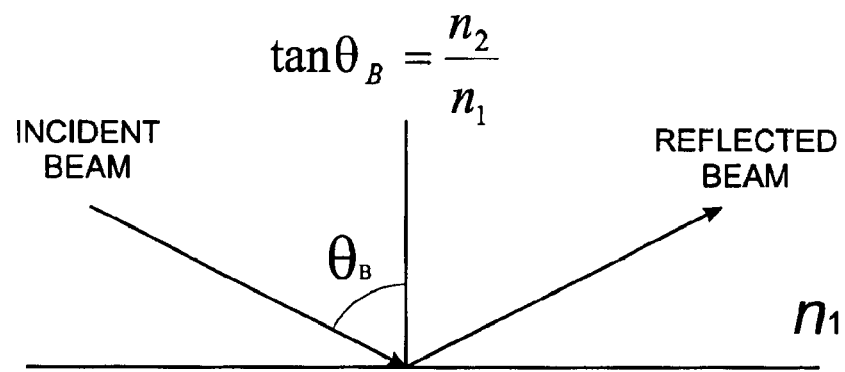
FIG._9B (PRIOR ART)
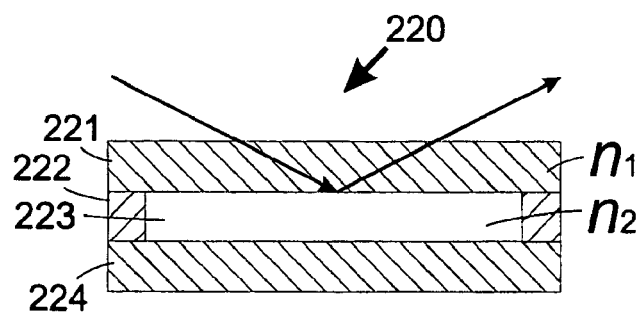
FIG._9C

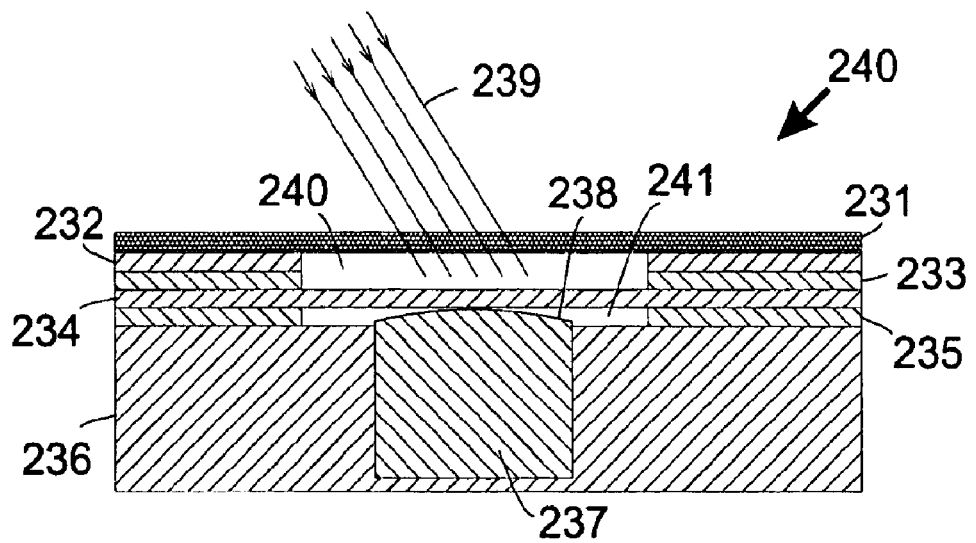
FIG._10A
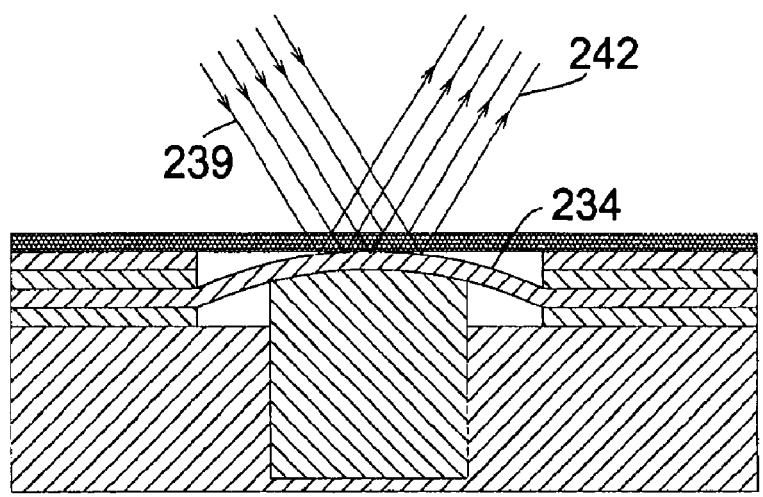
FIG._10B

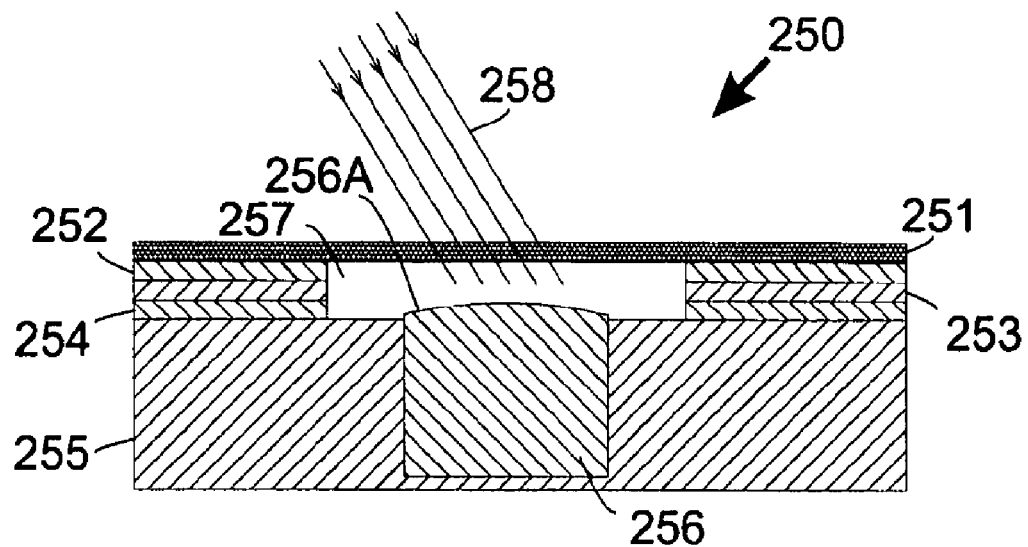
FIG._11A
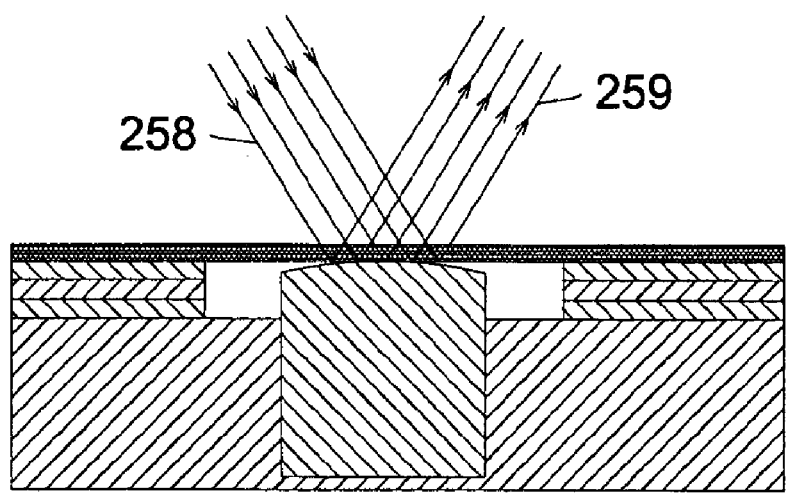
FIG._11B

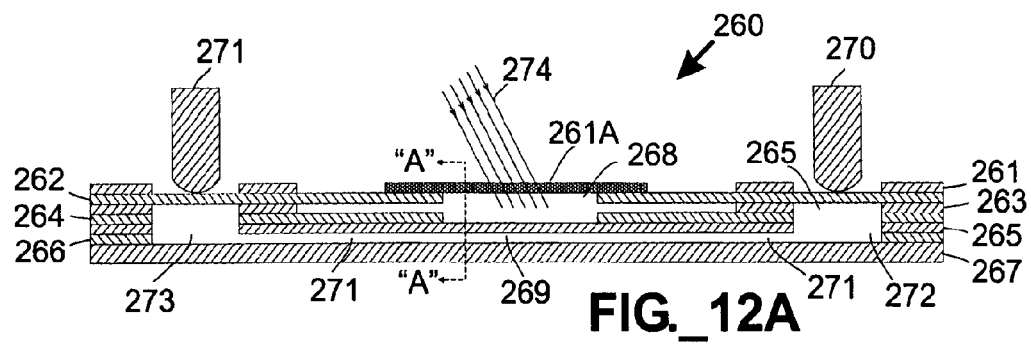
FIG._12A
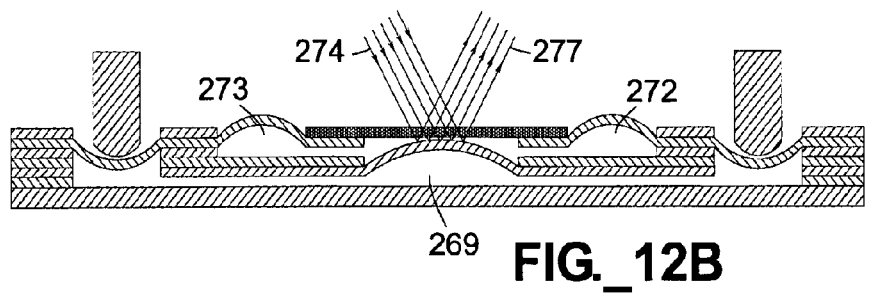
FIG._12B
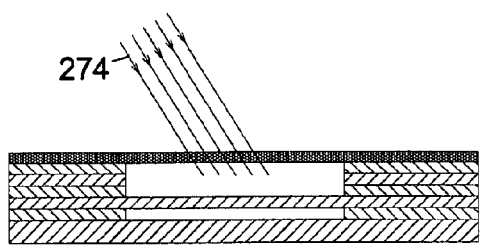
FIG._12C
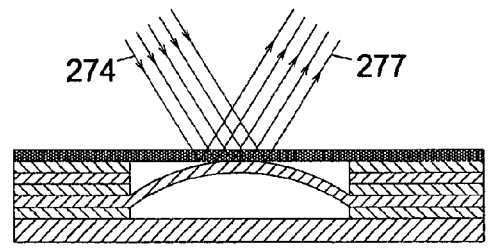
FIG._12D

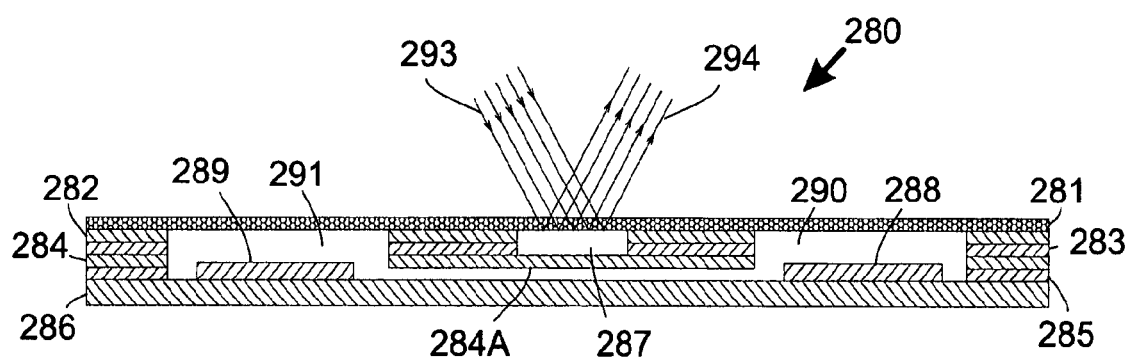
FIG._13A
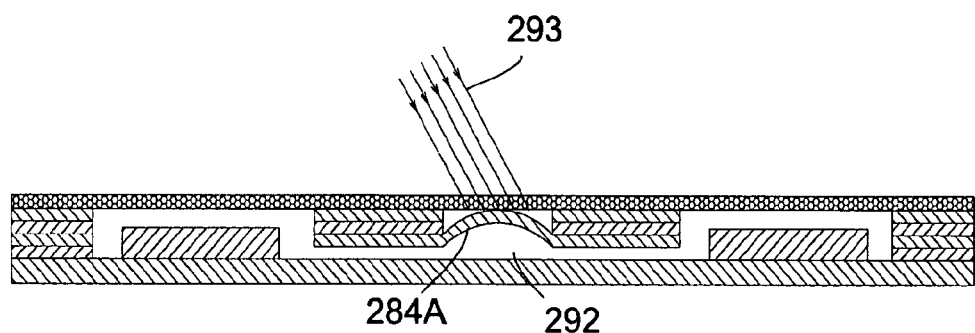
FIG._13B

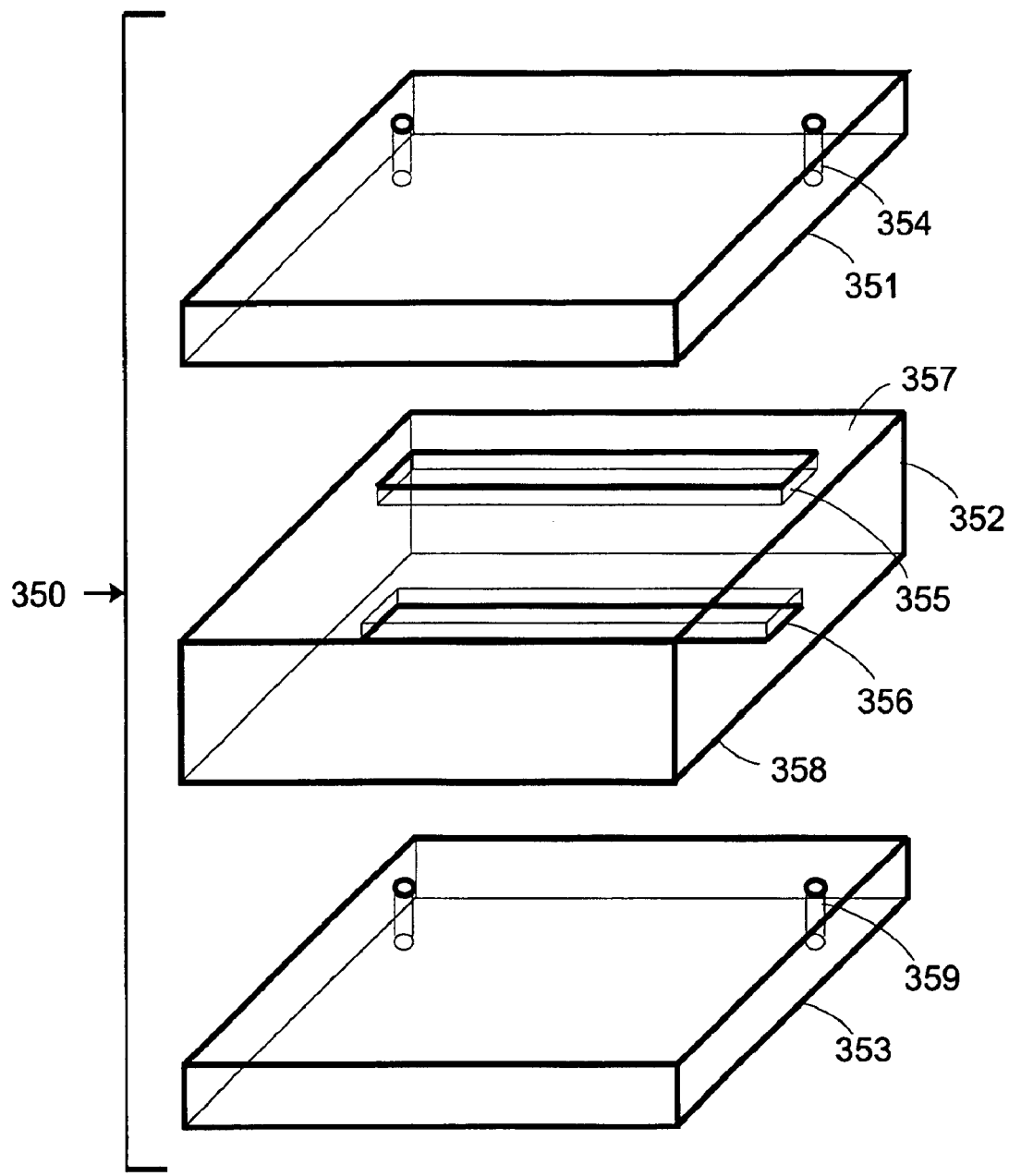
FIG._16A

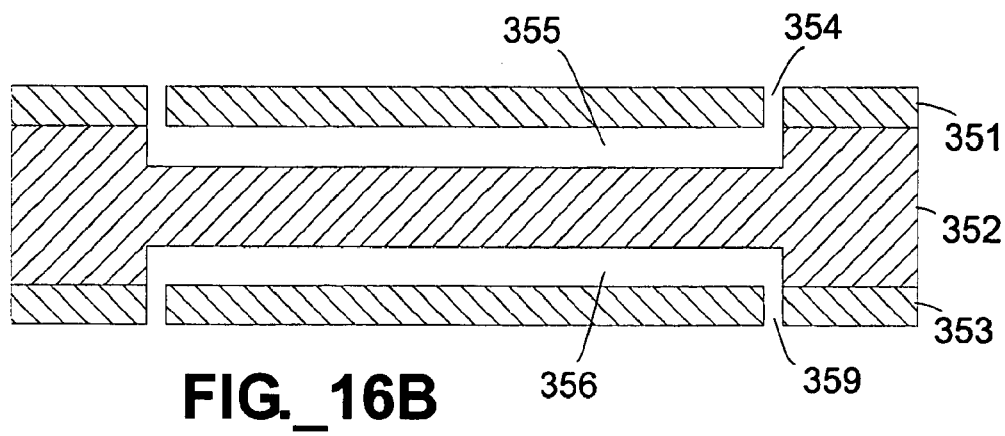
FIG._16B
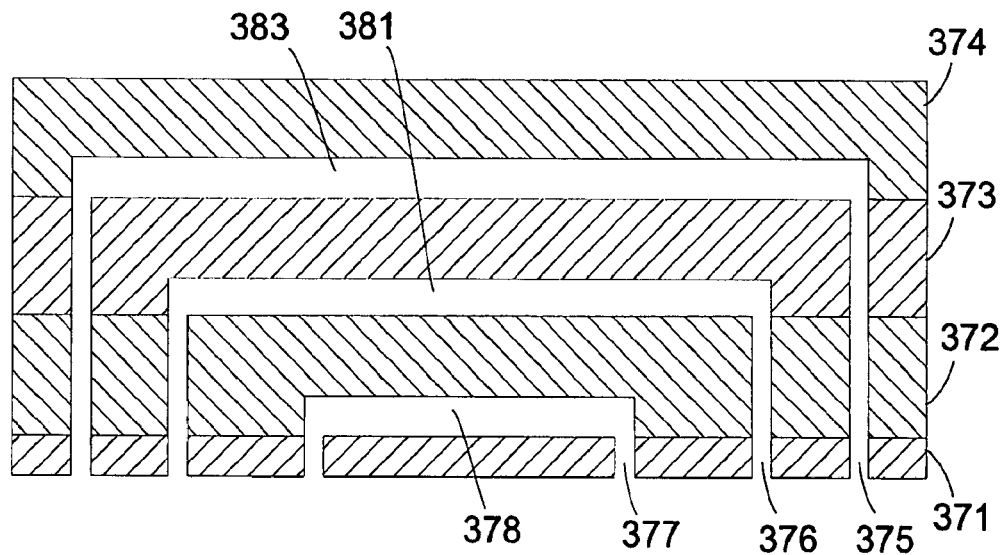
FIG._17B

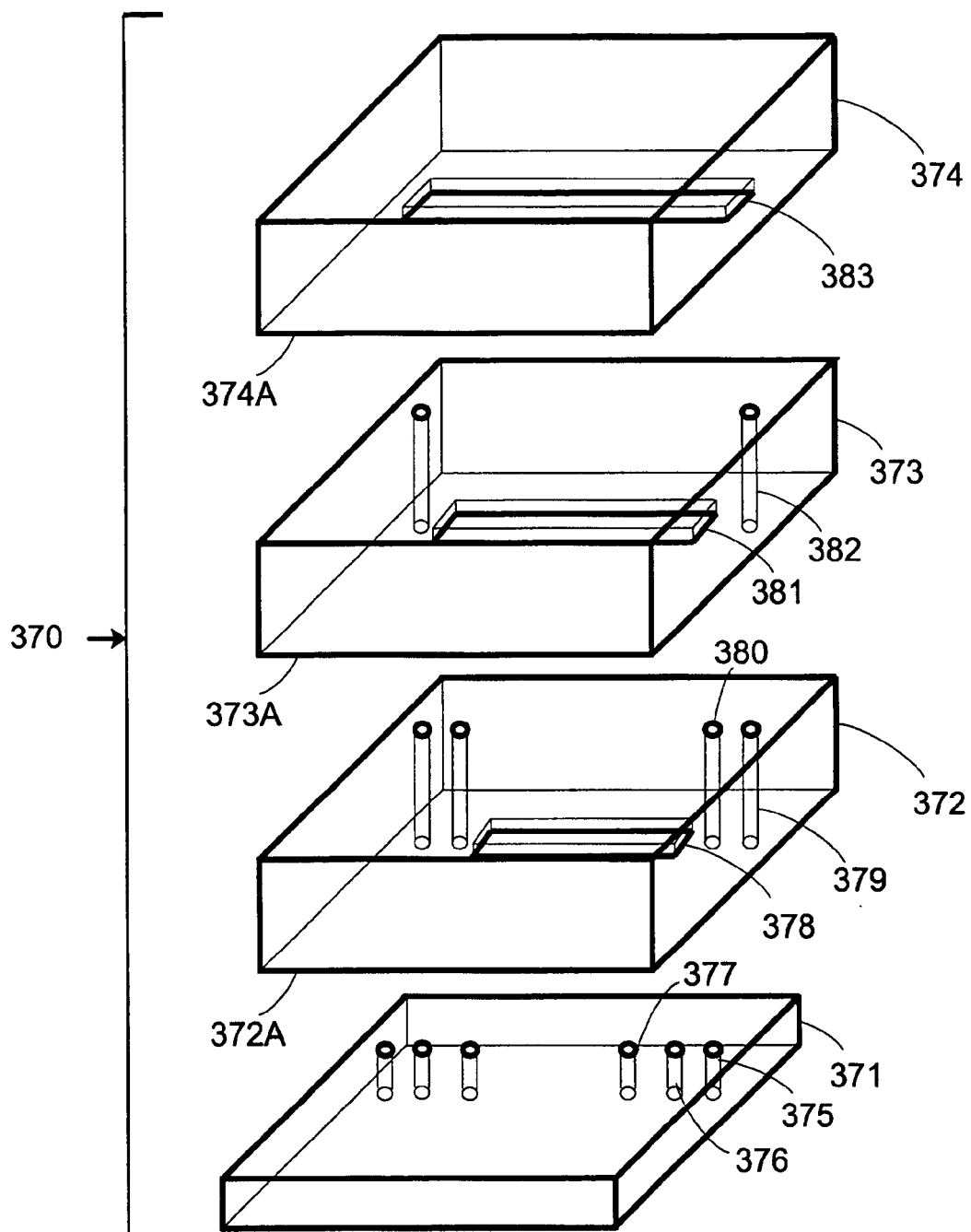
FIG._17A

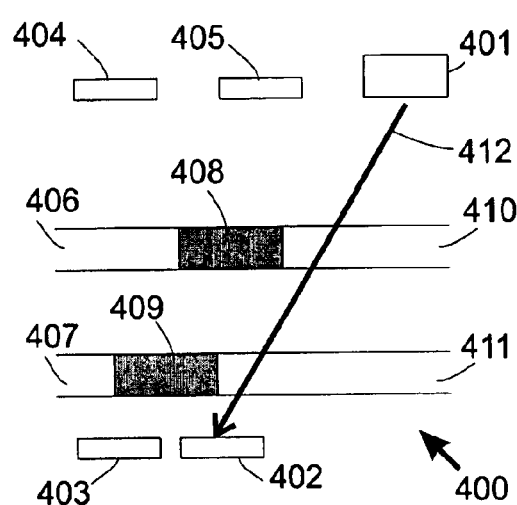
FIG._18A
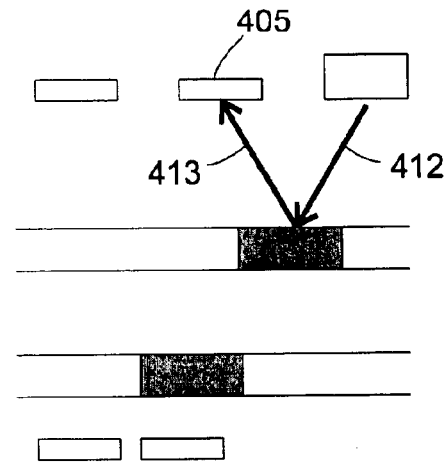
FIG._18B
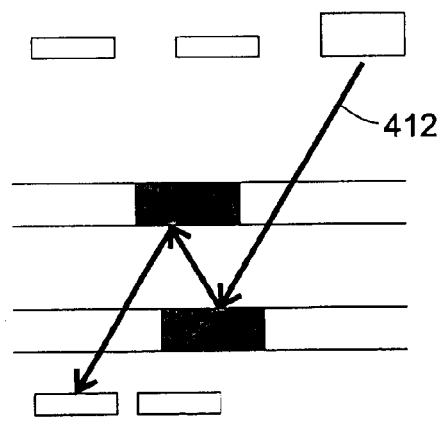
FIG._18C
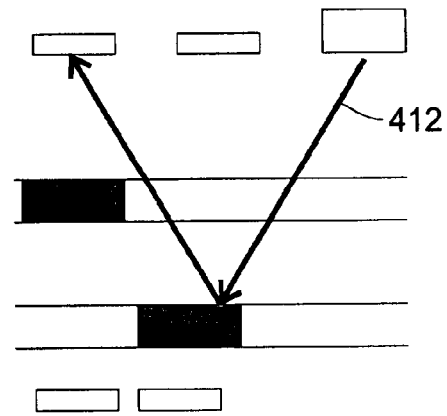
FIG._18D

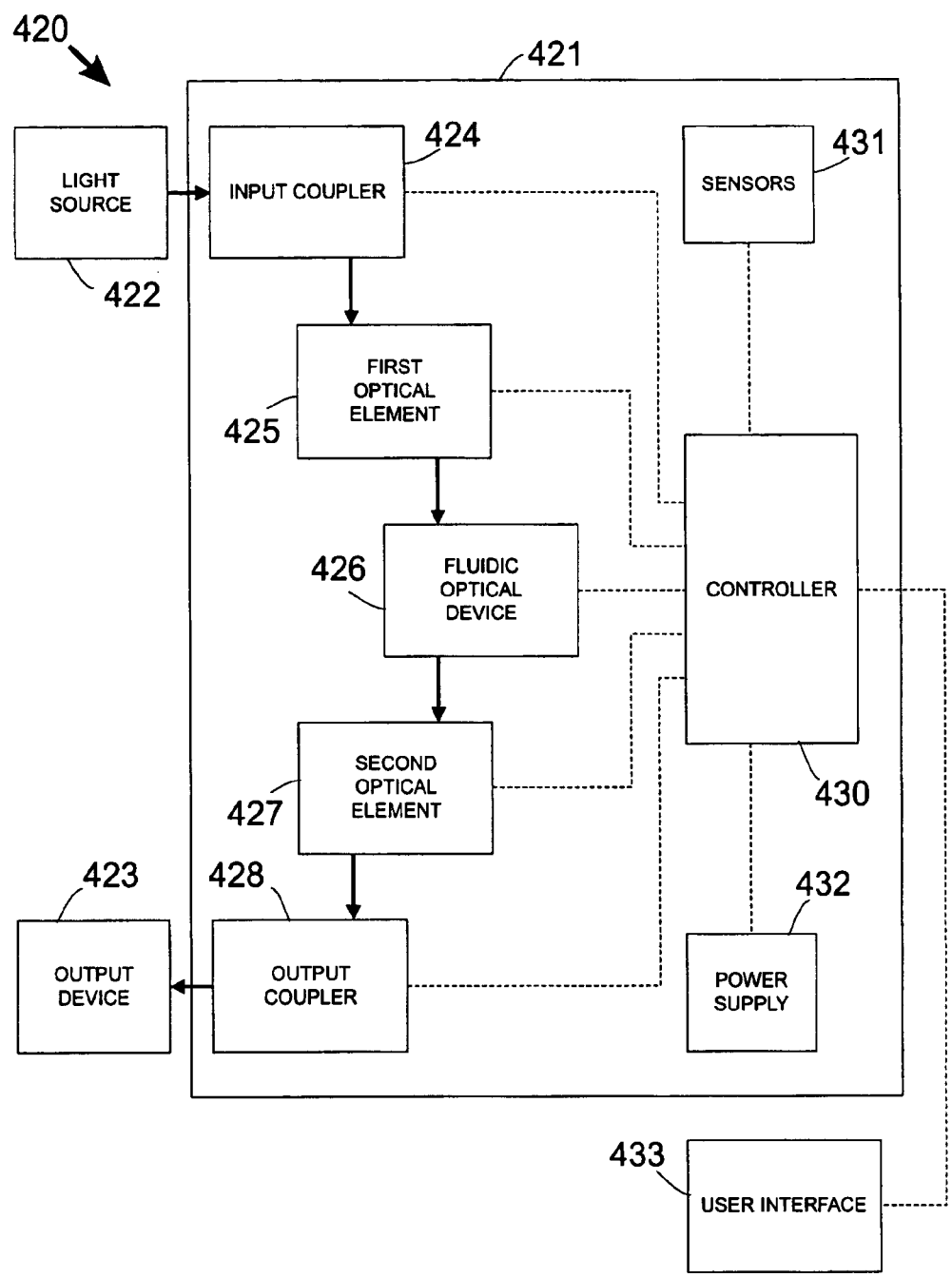
FIG._19

OPTICAL DEVICES WITH FLUIDIC SYSTEMS

CROSS-REFERENCE TO RELATED APPLICATION(S)

This application claims benefit of U.S. Application Ser. No. 60/226,174, filed on Aug. 15, 2000.

FIELD OF THE INVENTION

This invention relates to the use of fluidic systems, including microfluidic systems, to manipulate light.

BACKGROUND OF THE INVENTION

Fiber optic systems are now in common use for transmitting optical communication signals (i.e., optical signals modulated to encode desired information). Optical communication signals are transmitted across a network using optical fibers that support substantial transmission capacity with compact fiber bundles. Given the ever-increasing demands for improved signal quality and bandwidth, it is anticipated that the use of fiber optic communications will continue to increase for years to come.

In addition to bandwidth density advantages, a further reason why fiber optic networks have attracted attention in recent years relates to potential switching advantages. Conventional electronic switching components create bottlenecks in network communication, particularly when switching high bandwidth signals. Because the communication signals in fiber optic networks are optical rather than electrical in nature, bottlenecks caused by conventional electronic switching components potentially may be eliminated. A variety of optical switching technologies are reputed to be under development, including MEMS micromirror array switches and 'bubble' or 'droplet' switches utilizing inkjet dispensing technology. Questions remain, however, about fabrication difficulties and/or robustness of these devices, and commercial embodiments of these technologies have yet become widely available. There remains a commercial need for robust optical switching devices that may be readily manufactured.

There also exist needs for active optical devices in other fields not necessarily directed to optical switching. For example, in research environments it is often desirable to provide electromagnetic radiation to a test sample, then vary a characteristic of that radiation (such as, for example, intensity or spectrum), and finally detect or measure some interaction with the sample as a function of the supplied radiation. Collimated, polarized, monochromatic, and/or laser light is often desirable in such environments. Conventional methods of varying radiation characteristics from a fixed source include placement of filter elements between the source and a sample. To facilitate rapid changing of elements, filter "wheels" having multiple elements may be provided in the path of the incident beam. However, such methods involving discrete filter elements are digital in nature, thus limiting their ability to vary filtering utility in very small increments. As a result, there exists a need for dynamic optical devices that may be continuously varied.

The present invention provides, inter alia, novel devices and methods that can be used for switching communication signals in fiber optic networks, for dynamic optical devices, and for other applications that require manipulation of light waves.

SUMMARY OF THE INVENTION

This invention relates to the use of fluidic systems, including microfluidic systems, to manipulate light by light-fluid interaction. Fluidic optical manipulation may be used to achieve various effects.

In one aspect of the invention, a fluidic optical system includes a light source, a light receiver, a microfluidic device containing a plurality of fluids behind a substantially transmissive window for altering a light beam by light-fluid interaction, and manipulation means for varying the proportion of at least one of the fluids optically disposed between the light source and light receiver. The fluidic optical system may be a microfluidic system. Interaction between the light and one or more fluids within the fluidic device may affect reflection, refraction, absorption, optical filtering, or scattering of the light beam.

In a separate aspect of the invention, an optical processing system includes an input light source and input coupler, an output coupler for providing light to an output device, and a fluidic optical device coupled between the input coupler and the output coupler. The fluidic device is used to manipulate light provided to the processing system. The fluidic system may be a microfluidic system.

In a further separate aspect of the invention, a method for performing optical switching includes the steps of: providing a light source, a light receiver, and a microfluidic channel containing a discrete plug of fluid, and manipulating the fluid plug to selectively enable light emitted from the light source to be received by the receiver. Various ways of manipulating the fluid plug may be employed.

In another separate aspect of the invention, a method for performing optical switching includes the steps of: providing a light source, a light receiver, a fluid-containing microfluidic channel having a deformable member in fluid communication with the channel, and deforming the deformable member to displace fluid within the channel so as to selectively enable light emitted from the light source to the received by the receiver.

In another separate aspect of the invention, a light beam may be altered by providing a fluidic device having a fluid-containing chamber with a flexible membrane, supplying a light beam to the device in the direction of the flexible membrane, and manipulating the pressure within the chamber to after the geometry of the fluid and/or membrane in the path of the beam. The chamber may be a microfluidic chamber.

In a further separate aspect of the invention, a method for performing optical switching includes the steps of: providing a first fluidic optical device disposed in a first device layer and a second fluidic optical device disposed in a second device layer, supplying a light beam to the first microfluidic optical device, and manipulating the first device to selectively transmit at least a portion of the light beam to the second microfluidic device.

In a further aspect of the invention, one or more of the foregoing aspects may be combined to provide additional advantage. The foregoing and additional aspects of the invention are described herein.

Definitions

The term "channel" as used herein is to be interpreted in a broad sense. Thus, it is not intended to be restricted to elongated configurations where the transverse or longitudinal dimension greatly exceeds the diameter or cross-sectional dimension. Rather, such terms are meant to comprise cavities or tunnels of any desired shape or configuration through which liquids may be directed. Such a fluid cavity may, for example, comprise a flow-through cell where fluid is to be continually passed or, alternatively, a chamber for holding a specified, discrete amount of fluid for a specified amount of time. "Channels" may be filled or may contain internal structures comprising valves or equivalent components.

The term "microfluidic" as used herein is to be understood, without any restriction thereto, to refer to structures or devices through which fluid(s) are capable of being passed or directed, wherein one or more of the dimensions is less than 500 microns. The construction of microfluidic devices is described in co-pending applications, U.S. patent application Ser. Nos. 09/550,184 and 09/453,029, the entire contents of which are incorporated herein by reference. Construction of microfluidic devices is also described in two WIPO PCT patent applications, application nos. PCT/US00/27366 and PCT/US00/27313, which were published on Apr. 12, 2001.

The term "fluidic" as used herein is to be understood, without any restriction thereto, to refer to any type of device that is built to control and manipulate any type of fluid. Additionally, these devices can be constructed using channels, chambers, valves, and other fluidic components that behave as do most macroscopic systems, or the devices can be constructed in a way so that they are considered microfluidic devices. Many of the examples in this patent were constructed by the inventors using microfluidic devices.

The term "fluid" as used herein is to be understood, without any restriction thereto, to refer to any type of fluid that may be used, including but not limited to gases, liquids, gels, or plasmas. Additionally, the fluid may be a pure materials or a mixture of fluids. Additionally, molecules, particles, colloids or other types of material may be suspended or solvated within the fluid.

The term "light" as used herein is not intended to refer solely to visible light, but rather should be understood to refer broadly to electromagnetic radiation of all spectra subject to being affected by optical manipulation, unless specifically limited herein to a particular spectral band such as "infrared light" or "visible light".

The term "optically disposed" as used herein refers to placement in an optical path, such as between two points or elements (such as a light source and light receiver). An optical path between two elements may or may not coincide with a physical path. For example, a reflector may be optically disposed but not also physically disposed between a light source and light receiver.

The term "optically coupled" as used herein means connected, whether directly or indirectly, for purposes of transmitting a light beam. A first and a second element may be optically coupled if a beam may be provided from the first element to the second element, whether or an intermediate component manipulates the beam between the first and second elements.

BRIEF DESCRIPTION OF THE DRAWINGS

FIG. 1A is a cross-sectional diagrammatic view of a first fluidic device subjected to one incident beam. FIG. 1B is a cross-sectional diagrammatic view of a second fluidic device subjected to three incident beams.

FIG. 2A is a cross-sectional diagrammatic view of a fluidic channel filled with air and subjected to an incident beam. FIG. 2B is a cross-sectional diagrammatic view of the same fluidic channel subjected to an incident beam, but with the channel filled with fluid that refracts the beam.

FIG. 3A is an exploded perspective view of a five-layer fluidic overlap mixing device designed to provide active optical manipulation utility. FIG. 3B is a top view of the assembled device of FIG. 3A.

FIGS. 4A–4C are cross-sectional diagrammatic views of a fluidic channel of FIGS. 3A–3B containing two overlapping fluid layers in a first, second, and third proportion, respectively.

FIG. 5A is an exploded perspective view of a three-layer fluidic device having a deformable flexible membrane capable of affecting an incident beam in relation to the membrane deformation. FIG. 5B is a top view of the assembled device of FIG. 5A. FIGS. 5C–5D are diagrammatic views of operation of the device of FIGS. 5A–5B.

FIG. 6A is a cross-sectional diagrammatic sketch of a three-dimensional fluidic system for manipulating light using multiple substantially planar device layers. FIG. 6B is a cross-sectional diagrammatic sketch of a similar three-dimensional fluidic system having curvilinear device layers.

FIGS. 7A–7B are cross-sectional diagrammatic views of a fluidic optical variable refraction device having one internal channel in the path of an incident beam. FIG. 7C is a simplified cross-sectional diagrammatic view of a fluidic optical device having multiple fluidic channels in the path of an incident beam.

FIGS. 8A–8B are schematic views of a variable fluidic optical filtering system, including cross-sectional views of a fluidic device used with the system. FIG. 8C–8D are schematic views of displays indicating different outputs of the system of FIGS. 8A–8B.

FIG. 9A is a cross-sectional schematic of two adjacent materials having different indices of refraction. FIG. 9B is a diagrammatic view of a light beam traveling through a first medium and reflecting against a second medium at Brewster's angle. FIG. 9C is a cross-sectional view of a fluidic optical device for providing variable polarization utility, with a diagrammatic view of a light beam traveling through one surface of the device and reflecting against a liquid therein.

FIGS. 10A–10B are cross-sectional diagrammatic views of an actuated fluidic optical device for selectively manipulating an incident beam of light, the device having a flexible member between the actuator and a fluidic chamber.

FIGS. 11A–11B are cross-sectional diagrammatic views of an actuated fluidic optical device for selectively manipulating an incident beam of light, the device having an actuator in contact with fluid within the device.

FIGS. 12A–12B are side cross-sectional diagrammatic views of a fluidic optical device for selectively manipulating an incident beam of light with at least one external actuator located remotely from the region of fluid-light interaction. FIGS. 12C–12D are cross-sectional diagrammatic views of the fluidic optical device of FIGS. 12A–12B along section line "A—A."

FIGS. 13A–13B are cross-sectional diagrammatic views of a fluidic optical device for selectively manipulating an incident beam of light with at least one internal actuator located remotely from the region of fluid-light interaction.

FIG. 16A is an exploded perspective view of a multi-layer fluidic optical device having two fluidic channels defined in opposing surfaces of a central member for manipulating an incident beam of light with discrete fluid plugs located in different fluid channels. FIG. 16B is a cross-sectional diagrammatic view of the fluidic optical device of FIG. 16A.

FIG. 17A is an exploded perspective view of a multi-layer fluidic optical device having three fluidic channels defined in surfaces of several layers for manipulating an incident beam of light with discrete fluid plugs located in different fluid channels. FIG. 17B is a cross-sectional diagrammatic view of the fluidic optical device of FIG. 17A.

FIGS. 18A–18D are schematic views of a portion of a fluidic optical switching device capable of selectively switching a beam from one source to four different receivers by manipulating the positions of fluid plugs located in two different channels.

FIG. 19 is a schematic showing interconnections between various components of an optical processing system.

DETAILED DESCRIPTION OF PREFERRED EMBODIMENTS OF THE INVENTION

Figure 14:
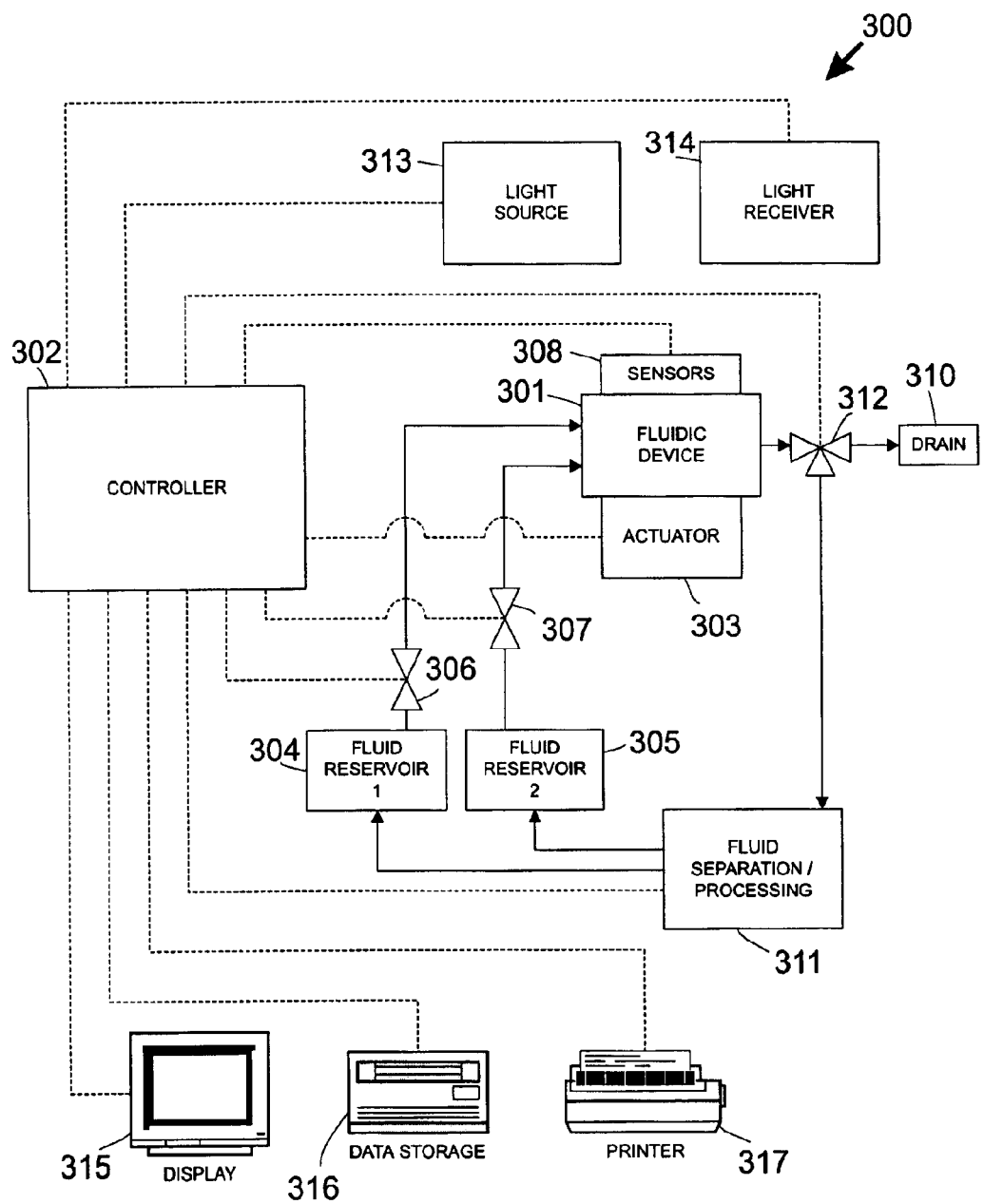
FIG. 14 is a schematic showing interconnections between various components of a fluidic optical system.

This invention describes fluidic devices that are capable of manipulating light. Incoming light may include various types of light, including but not limited to visible light, ultraviolet light, infrared light, far-IR light, and other frequencies of the electromagnetic spectrum. The light can be coherent or non-coherent, monochromatic or non-monochromatic, or collimated or diffuse. The source of such light can be a laser, a lamp, or other types of light sources.

In a preferred embodiment of the present invention, a network of fluidic channels is constructed so that the channels within the device can affect light that enters the device. In certain embodiments, the light is affected by the fluid that is passing through the device. In other embodiments, the fluid passing through the device has an indirect effect on the light. In another embodiment, the light is directly or indirectly affected by a stationary fluid. In certain embodiments, one or more fluids can be gases, liquids, gels, or suspensions. Liquid crystals may also be used.

Fluidic devices according to the present invention can manipulate light in many ways and can have various effects upon the light. In certain embodiments, a fluidic device attenuates the light. In certain embodiments, a fluidic device filters the light. This filtering may include frequency filtering or phase filtering. In certain embodiments, a fluidic device changes the position of the light or alters the light path. This light positioning can be accomplished by reflecting the light, refracting the light, or other ways. The positional movement can have different effects on different frequencies of the incoming light. In certain embodiments, the fluidic device may superimpose more than one light beam and cause them to interact. This interaction can be additive or subtractive, and may cause constructive or destructive interference. This interference can affect the light from one source or from multiple sources. The interaction can cause harmonic generations of the light and sub-harmonics. In certain embodiments, the fluidic device splits the light into multiple beams. In certain embodiments, the fluidic device focuses the light or is used as a diffuser. In certain embodiments, the fluidic device diffracts the light. In certain embodiments, the fluidic device may be used as a polarizer or de-polarizer.

In certain embodiments, the fluidic device is used to collimate the light. In such an embodiment, multiple devices can be used in series and/or parallel to collimate the light. In an alternative embodiment, the interior of the channels themselves can be used as light conduits. In certain embodiments, the light within the channels may undergo total internal reflection, such as occurs in optical fibers. The material from which the fluidic device is constructed can be tailored to enhance internal reflection for particular frequencies. Additionally, the surface of the channels can be coated or altered to enhance this effect.

The effects the devices have upon the light can be static and unchanging, or the effect can change depending on the condition of the fluidic device. In certain embodiments, it is desirable to permit the effect an optical component has on light to change over time, either automatically or whenever a user desires certain changes. Many traditional optical components such as lenses and filter are static and provide no ability to change. Certain embodiments of the fluidic systems described herein rely on the nature of the fluid within the fluid channel or chamber, and further upon the pressure within the channels and chambers, to control the optical manipulation. These fluids and pressures may be altered actively to render the optical device a dynamic device rather than traditional optical components, which are static. However, devices according to the present invention can also be used statically. Sensing and feedback may be provided to facilitate control. Examples of dynamic feedback include the injection of "plugs" of fluid of various sizes to control the duration and/or effect of the optical alteration. In other embodiments, a fluid front is moved in different directions to after the effect over time. In certain embodiments, more than one fluid injected into a device to provide additive or subtractive effects. Flow rates and pressures of one or more fluids of the multiple fluids can be manipulated to after the optical effect on incident light.

Since the systems described can be actively controlled, feedback systems can be added. The optical devices described here can be intelligent and change their internal properties depending on the conditions of the inputted light and outputted light. The device can also change its fluidic properties when other conditions change, such as fluidic conditions, temperature, electrical feedback, mechanical feedback, or other types of feedback.

A basic embodiment is shown in FIGS. 1A–1B. Referring to FIG. 1A, a beam of light 10 enters a fluidic device 11. Upon exiting the device 11, the resulting beam 12 is altered. Another embodiment is shown in FIG. 1B. In this embodiment, three light beams 13–15 enter another fluidic device 16. All three incident beams 13–15 are altered to become resulting beams 17–19. In FIGS. 1A–1B, light passes through the devices. However, light may be reflected, collimated, absorbed, focused, or altered in any other manner.

In a preferred embodiment, light enters into a fluidic device and passes through one or more sections of one or more fluidic channels. One or more fluids can be added to the channels to affect the light. The fluid may have various effects on the light.

In certain embodiments, the indices of refraction of fluids used can be different than the index of refraction of the surrounding medium. In this manner, the path of a light beam or beams can be altered by altering the fluid within the device at region where the light strikes the fluid. Different fluids may have different refractive indices and thus altering the fluid within a single fluidic channel can affect a light beam in a variety of ways.

In certain embodiments, the distance through which light travels within a fluidic device can be altered. The deflection of a light beam passing through a medium is related to both the refractive index and the distance of travel. Thus, by altering the travel distance, even more control may be added.

Referring to FIG. 2A, an incident light beam 21 passes through a fluidic device having a fluidic channel 24. In FIG. 2A, the channel 24 contains air, which causes negligible deflection of the light beam 21 as it passes through the channel 20 substantially unchanged as emerging beam 21A.

In this simplified drawing, deflection from the walls 22, 23 of the fluidic device 20 itself is not shown. In FIG. 2B, fluid 25 having a different refractive index than air is added to the channel 24. The path of the incident light beam is altered within the channel 24 and thus the position of the emerging beam 26 is altered.

In another preferred embodiment, a fluidic device can be used as a filter. Fluids can be added to a channel placed in the path of a light beam to either absorb certain frequencies or reflect certain frequencies of light. This effect can be provided by the fluid itself, or by molecules added to the fluid. Alternatively, colloids or particles can be suspended in the fluid to provide a desired effect. Further alternatively, molecules that absorb and/or emit light can be used. Alternatively, fluorescent, chemiluminescent, or electro-chemiluminescent molecules or particles may be used.

In another preferred embodiment, a fluidic device is used as an attenuator. In this embodiment, a fluid absorbs part of the energy of light passing through the device. Alternatively, the fluid can contain particles, molecules, colloids or other materials that perform the attenuation. In certain embodiments, a fluidic device acts as a shutter that may completely shut off the light.

In a preferred embodiment, two fluids can be co-located within a given region of a fluidic device such that the fluids have an additive or subtractive effect on light. Referring to FIGS. 3A–3B, a fluidic mixing device 99 is constructed. Referring to FIG. 3A, the device 99 is constructed from a five stencil layers 100–104 that define channels 105–107, vias 108, inlets 109, 110, and outlets 112, 113. The stencil layers 101–104 are constructed from layers of single-sided tape (3 mil polypropylene carrier with silicone-based adhesive on one side) and the channels 105–107 are all 45 mils wide. The bottom stencil layer 100 is a ¼ thick acrylic block. The inlets 109, 110, outlets 112, 113, and vias 108 are all 60 mils in diameter. The completed device 99 is shown in FIG. 3B. A first fluid is provided to the first inlet channel 107 (defined in the second layer 103) through inlet 110. A second fluid is provided to the second inlet channel 105 (defined in the fourth layer 101) through inlet 109 and via 108. The two inlet channels 107, 105 are in fluid communication at an overlap region 111 located at the entrance to the mixing channel 106. At the overlap region 111, the two fluids are forced to enter the mixing channel 106, which provides an interfacial contact area between the two fluids that extends all the way across the width of the channel. At the region just before the fluids begin to mix 111, two layers of fluid are present. The cross section of this region only (where the fluids are layered within the channel mixing region 111) is shown in FIG. 4A–4C. When operated as a fluidic optical device, a light beam can be provided to the region 111 when fluids are present. Fluid 120 is injected into the inlet port 110 (see FIGS. 3A–3B). Fluid 121 is injected into the inlet port 109, which leads to the lower portion of the mixing device 99. At the entrance of the mixing region 111, the fluids have not had sufficient time to mix and form two layers, as shown in FIGS. 4A–4C. In a preferred embodiment, the flow rates of the two fluids are equal and the thicknesses of each fluid layer 120, 121 are approximately equal within the mixing region 111 as shown in FIG. 4A. Because lateral deflection due to refraction depends in part on the thickness of the refractive material, varying the relative thicknesses of the fluid layers within the mixing region 111 affects deflection of light emerging from the region 111. The thicknesses of the fluid layers 120, 121 may be varied by altering the respective flow rates of the fluids. As illustrated in FIG. 4B, a greater amount of fluid 121, such as may be provided by increased flow rate, is inserted into the channel, which thickens fluid layer 121, thus increasing its effect on incident light relative to fluid layer 120. Alternatively, fluid 120 may occupy a larger volume, such as illustrated in FIG. 4C. In another preferred embodiment, the flow rate of one fluid is reduced to practically zero so that all of the refractive effect is provided by the fluid present in the region 111.

In another embodiment of this invention, a fluidic system can rapidly change its effect on incident light. A system can be provided to rapidly change fluid flow rates and rapidly change the effect of fluids on the light. In one particular embodiment, two immiscible fluids can be used. As one example, oil could be used as fluid 120 and water as fluid 121. In this embodiment, the fluids are injected into the system and do not mix through any portion of the outlet channels. A light beam can enter into the region 111, be deflected a certain amount by the oil layer, then be deflected another different amount by the water. If the flow rate of the oil and water are changed relative to one another, the distance by which the beam will pass through the oil will change, the light will be deflected a different amount, and the beam will be deflected a different amount.

In another embodiment, active optical filters can be constructed using the above fluidic mixer device. Two different fluids can be used that have different absorption effects on the light. For instance, one fluid may absorb red light and the other may absorb green light. The relative thicknesses of the fluid layers affect the band of light absorbed by the active optical filtering device.

In another preferred embodiment, the light interacts with the interfacial junction of two different fluids. In a preferred embodiment, a simple channel is constructed and a plug of fluid enters the channel. Alternatively, a series of plugs can be used to produce a repeatable effect. The light passes through a fluidic optical device, and when the light strikes the edge of a plug, the light is altered. In a preferred embodiment, a reflective metal such as mercury or silver can be used within a fluidic optical device. Light is directed to an area within the device where it contacts the reflective fluid. When the reflective fluid front is in the path of the light, the light is reflected to a new position. As the reflective fluid is moved, the light may be reflected to a different position. The reflective fluid plug can be moved by positive or negative pressure to alter the reflection. In this manner, a number of different light effects can be caused by a single plug.

In another preferred embodiment, the geometry of the fluidic device and/or fluid contained within may be manipulated to have an effect on incident light. In a preferred embodiment of the invention, a fluidic device is constructed from a material that can alter its shape, thus varying the effect on the light. Referring to FIG. 5A, a fluidic device 130 according to one embodiment is constructed from three stencil layers 131–133. The first layer 131 has an inlet and outlet ports 134, 135, the second layer 132 defines a channel 136 having a rounded central region 137, and the third layer 133 is a flexible membrane. The completed device 130 is shown in FIG. 5B. In operation, fluid is passed through the channel 136 and light is provided to the center of the rounded region 137. When the pressure within the channel 136 is low, incident light passes through the device 130 undisturbed if the incident light is perpendicular to the surface 133, such as shown in FIG. 5C. When pressure within the channel 136 increases, the flexible top stencil layer 133 is deformed outward, more fluid fills the cavity 137 in a rounded-hemispherical shape behind the flexible layer 133, and the fluidic device 130 forms a convex lens such as shown in FIG. 5D. In an alternative embodiment, a light beam can be provided off-center to the rounded region 137. When the pressure in the channel 136 increases, the region 137 acts as a light-deflecting element, thus altering the path of the light. Devices according to FIGS. 5A–5D have been constructed and tested. A variety of fluids can be used with the fluidic optical devices described above to alter their effects on light. Additionally, embodiments of the invention can be used in combination with one or more other fluidic devices and/or in combination with other fluidic components, such as mixers. For example, a fluidic optical variable filtering mixer can supply fluid to a lens device according to FIGS. 5A–5D and thus manipulate light in multiple ways.

An advantage of using fluidic systems according to the present invention is that on a given platform, the optical components can be multiplexed and/or be additive in a relatively small area. An incident beam may be affected by a plurality of fluidic optical elements in a single device or multiple interrelated devices.

In a preferred embodiment, a three-dimensional fluidic system for the manipulation of light may be constructed. In this embodiment, optical components may be positioned in relation to one another to create a multiplexed system. Referring to FIGS. 6A–6B, three-dimensional fluidic systems are is shown. In FIG. 6A, the fluidic system 140 includes a first layer 141 having a fluidic light deflector 142. When the deflector 142 is in the off position (for instance, when a fluid having a negligible effect on incident light is present in the light path), then incident light passes straight through the deflector. The refractive effect that the deflector 142 may have on the light may be manipulated by altering the refractive index of fluid present in the deflector 142, or by altering the optical path length within the deflector 142 as defined by deflector channel and fluid geometry. The refractive index of the fluid may be modified by altering the fluid composition in the deflector 142. The channel and fluid geometry can be manipulated by applying various pressures and flow rates.

A second layer 143 of the system 140 has three fluidic light deflectors 144, 145, 146 in that are preferably all the same. Each of the deflectors 144, 145, 146 can be individually or collectively controlled. In operation, a light beam enters the first layer 141 of the system 140 at the deflector 142. Depending on the condition of each of the deflectors 142, 144, 145, 146, the beam may be deflected to a variety of positions and directions. For example, FIG. 6A illustrates several possible deflected beams as arrows, while actual path taken by a particular beam is indicated with bold arrows. These positions and directions are not limited to a two-dimensional plane of incidence. In this manner, complex optical switching systems can be constructed. Notably, the system layers 141 and 143 are not limited to planar configurations; rather, curvilinear layers, such as illustrated in FIG. 6B, may be provided.

In another embodiment of the invention, a fluidic optical variable refraction device may be constructed. Referring to FIG. 7A, a fluidic optical variable refraction device 150 having a single channel 156 is provided. A light beam 151 provided at an angle θ relative to the upper layer 155 of the device strikes the upper layer 155. Some of the incident light 151 reflects off of the surface 155 of the device 150 at an angle θ to form a reflected beam 152. The rest of the light penetrates the upper layer 155 and enters the fluidic channel 156, which contains a fluid having a refractive index $n_2$. Depending upon the refractive index of the material of the first layer 155 that defines the channel 156 and the refractive index of the fluid within the channel 156, the light is refracted a certain amount. The refracted light 151A then hits the lower layer 157 at a different angle θ' and is reflected back at the same angle θ' to generate a reflected beam 153A, which upon exiting layer 155 is refracted to exits the device 150, again at an angle θ. When the fluid within the fluidic channel 156 is changed to a fluid having a different refractive index $n_{2A}$ (see FIG. 7B), the incident angle θ does not change, but the internal angle (formerly θ') becomes θ" and the beam of exiting light 153 has altered its position.

Multiple fluidic channels may be provided in a fluidic optical variable refraction device to provide further function. Referring to FIG. 7C, a three-dimensional device 160 is constructed with fluidic channels 161, 162, 163 stacked upon one another to form a fluidic prism. FIG. 7C is a simplified representation of a physical system, in that the thicknesses of each horizontal channel wall is represented by only a line. Additionally, the refractive effects of each channel wall has been ignored for the sake of simplicity. Light enters through the top layer 164 of the device 160 and passes through three different channels 161, 162, 163. The channels 161, 162, 163 may contain fluids having different refractive indices (n1–n3, respectively). The incident light beam 165 is split into multiple components, shown by the rays 166, 167, 168, 169 exiting the device 160, each ray of which has a different frequency component as compared to one another. The frequency components of the rays 167, 168, 169 can be altered by changing the refractive indices of the fluids present within each of the fluidic channels 161, 162, 163.

In certain embodiments of the invention, optical components utilize disposable chips that may be replaced after use. In other embodiments, fluids used to alter light may be recycled back through the fluidic channels for re-use. In other embodiments, fluids within the fluidic optical devices can be stored in reservoirs (within the devices or off-board) and pumped out to the optical components when needed. In other embodiments, the fluids can be stored in off-board containers and supplied when needed to fluid interaction regions in the devices.

In certain embodiments, one or more interior surfaces of the fluidic devices are coated to enhance the optical properties.

In a preferred embodiment, a fiber-optic switching device may be constructed according to the present invention. In this embodiment, multiple fibers are used as the inlets of a fiber optic switching system. These fibers can carry one signal or many signals. Multiple fibers also serve as outlet fibers. A fluidic optical device is placed between the inlet fibers and outlet fibers. One or more embodiments described herein may be used to direct the optical signals from certain inlet fibers (light sources) to certain outlet fibers (light receivers). The direction of these signals can be altered as described herein. In this manner, a complete optical switching system can be constructed.

Fluidic optical devices according to the present invention may be fabricated in various ways using a wide variety of materials. Preferably, fluidic optical devices are fabricated in multiple layers, at least one layer being a cover layer for sealing fluidic channels and/or chambers within the device. In a preferred embodiment, a fluidic optical device is fabricated from materials such as glass, silicon, silicon nitride, or similar materials. For example, glass materials or the like glass materials or the like can be used where it is desirable for the material to pass visible wavelengths, and quartz materials can be used where it is desirable to pass infrared light. Additionally, silicon materials may be used to reflect or absorb light. Various conventional machining or micromachining techniques such as those known in the semiconductor industry may be used to fashion channels and chambers in these materials, including wet or dry etching and laser ablation. Channels, chambers, and/or apertures may be made into one or more surfaces of a material or penetrate through the material. Various layers of these devices may be attached by techniques including adhesive, thermal, chemical, or light-activated bonding; mechanical attachment (such as using clamps or screws to apply pressure to the layers); or other equivalent coupling methods. These techniques, whether or not coupled with conventional fabrication techniques, may be used to fabricate either macrofluidic or microfluidic optical devices. Polymeric, metallic, and/or composite materials may also be used in fabricating devices according to the present invention.

In a preferred embodiment, fluidic optical devices are constructed using stencil layers to define channels and/or chambers. A stencil layer is substantially planar and has a channel or chamber cut through the layer. When assembled in a fluidic device, the top and bottom surfaces of stencil layers may mate with one or more adjacent stencil or substrate layers to form a closed device. In one embodiment, one or more layers of a device are comprised of single- or double-sided adhesive tape. A portion of the tape (of the desired shape and dimensions) can be cut and removed to form channels, chambers, and/or apertures. A tape stencil can then be placed on a supporting substrate, between layers of tape, or between layers of other materials. In one embodiment, stencil layers can be stacked on each other. In this embodiment, the thickness or height of the channels can be varied by varying the thickness of the stencil (e.g. the tape carrier and the adhesive material thereon) or by using multiple substantially identical stencil layers stacked on top of one another. Various types of tape are useful with this embodiment. Suitable tape carrier materials include but are not limited to polyesters, polycarbonates, polytetrafluoroethlyenes, polypropylenes, polyimides. Such tapes may have various methods of curing, including curing by pressure, temperature, or chemical or optical interaction. The thicknesses of these carrier materials may be varied.

In one embodiment, a variable fluidic optical filter utilizing a plurality of fluids may be constructed. Referring to FIG. 8A, a variable fluidic optical filtering system 190 includes a supply of two different fluids according to one embodiment. Fluids are supplied to a fluidic device 191 from two fluid reservoirs 192, 193 with flow of the respective fluids to the device 191 controlled by valves 194, 195. The device 191 has separate inlet ports 196, 197 for accepting the fluids, which may be mixed within the device 191 at a mixing or layering region 198. From the mixing or layering region 198, fluid within the device 191 passes into a common channel 199 behind a first window region 200 that permits a beam of light 201 from an external light source 202 to interact with the fluids. Thereafter, fluid exits the device 201 through an outlet port 203 and may be captured by a drain reservoir 204. In the particular embodiment shown in FIG. 8A, the incident light passes through the first window region 200, interacts with the fluid behind the first window region 200, and a modified portion of that light 205 emerges from the device 201 through a second window region 206 to be received by a light receiver or detector 207. The detector 207 is connected to a data processor 208 associated with a data recorder/display 209 for communicating information to the user, such as a spectral curve 210. Types of information that may be recorded and/or displayed include characteristics such as intensity, frequency, wavelength, or position, among others.

The light source 202 may provide practically any band of electromagnetic radiation, including visible light, infrared, UV light, or others. Additionally, the incident light may also be focused, collimated, polarized, or monochromatic, such as laser light. Appropriate filters or optical components may be used to provide such characteristics where desired by the user. The detector XX may include a charge-coupled device (CCD), a photo multiplier tube (PMT), or other detecting elements known in the art. The fluid-optical device 191 is illustrated as being composed of five discrete layers, although greater or fewer layers may be provided depending on the particular method of construction. In the illustrated system, wherein the light source 202 and light detector 207 are disposed on opposite sides of the device 191, at least a portion of all layers of the device 191 should be substantially optically transmissive of a particular wavelength band of interest to the user. For instance, if it is desirable to provide visible light to the device 191, then the device layers may be composed of materials such as glass, quartz, polycarbonate, or other clear polymeric materials. As would be recognized by one skilled in the art, other materials could be used to transmit the visible spectrum or other band where desired. Materials may be chosen to optimize the interaction with the frequency of light chosen. Additionally, devices according to the present invention may be composed of multiple materials. For instance, a device may include one layer fabricated from silicon, and an other layer made from glass. The inlet ports 196, 197 along a surface of the device 191 are in fluid communication internal channels leading to the mixing or overlap region 198. One function of the mixing or overlap region is to ensure a relatively uniform distribution of fluid across the height and width of the channel 199 behind the window region 200 where light interacts with the fluids in the device 191. Notably, the device 191 may be either a microfluidic device or a conventional fluidic (macrofluidic) device The presence of multiple fluidic valves 194, 195 each associated with a fluid reservoir (e.g., reservoir 192 or 193) permits the proportion of each fluid supplied to the device 191 to be varied. For example, the first fluid may be a pure fluid (or solvent) and the second fluid may include a dissolved light-absorbing dye. As a particular experiment is initiated, fluid flowing to the device 191 may be exclusively solvent, such as water. Over time, the second valve 195 may be progressively opened (whether or not coupled with progressive closure of the first valve 194) to admit a greater percentage of dye to the device 191, thus supplying a solvent/dye mixture of varying concentration to serve as a progressively variable active optical filter. Notably, one or more outlet valves (not shown) may be provided downstream of the window region 200 and closed so as to capture and hold fluid present behind the window 200 for a desired length of time. Thus, the variable active optical filtering device 191 of the present embodiment may provide either a continuous flow of fluid behind the window 200 or a motionless fluid sample behind the window 200. In either operational mode, the proportion of fluids subject to interaction with incident light may be varied.

Effects of operating a system according to FIG. 8A may include attenuating the intensity of incident light and/or attenuating certain frequencies of incident light. For example, if the concentration of a light-absorbing fluid is high within the device 191, then the intensity of light received by the detector 207 may be relatively low, as depicted by the graph 210 of FIG. 8A. As the concentration of light-absorbing fluid is reduced, such as by dilution with a second fluid, then the intensity of incident light may be only slightly attenuated, permitting higher intensity light to be received by the detector 207, as depicted by the graph 211 of FIG. 8B. If two different colored solutions are supplied to the device, then different frequencies of light may be absorbed or transmitted by varying the concentration of the solutions, as depicted in FIGS. 8C–8D. In FIG. 8C, a first frequency band is transmitted through the device 191 substantially unattenuated but a second frequency band is attenuated (as depicted in the graph 212); while in FIG. 8D, the first frequency band is substantially attenuated but the second frequency band passes through the device 191 at relatively high intensity (as depicted in the graph 213). The different results between FIGS. 8C–4D may be achieved by varying the proportion of two colored fluids over time.

In other embodiments, more than two fluids may be supplied to the device in varying proportions. That is, three or more fluid reservoirs each having an outlet valve may be provided, with a fluidic optical device fabricated to accept three or more fluids and supplying a mixture or layered combination of those fluids to a window region for interaction with incident light.

In a further embodiment, a fluidic device capable of polarizing light to a varying degree may be provided. With respect to light radiation, polarization may be defined as the restriction of the vibrations of the magnetic or electric field vector to a single plane. In a beam of electromagnetic radiation, the polarization direction is the direction of the electric field vector, without distinction between positive and negative as the field oscillates back and forth. The polarization vector is always in the plane at right angles to the beam direction. Near some given stationary point in space the polarization direction in the beam can vary at random (an unpolarized beam), can remain constant (plane-polarized beam), or can have two coherent plane-polarized elements whose polarization directions yield a right angle. In the latter case, depending on the amplitude of the two waves and their relative phase, the combined electric vector traces out an ellipse and the wave is said to be elliptically polarized. Elliptical and plane polarizations can be converted into one another by means of birefringent optical systems.

A common method of polarizing light is by using a polarizing filter or lens. A well-known but less commonly used method of polarizing light involves transmitting light through a medium having a first index of refraction ($n_1$), and into a medium having a second index of refraction ($n_2$) at an angle of incidence equal to "Brewster's angle" ("$\theta_B$"). The light transmitted through the second medium is partially polarized, while the light reflected off the interface is completely polarized in a direction perpendicular to the plane of incidence. The interface between two media having different indices of refraction $n_1$ and $n_2$ is provided in FIG. 9A. Notably, the two media need not both be solids or gases; they may also be fluids. In the present embodiment, the first medium (having refractive index $n_1$) is preferably a solid, substantially transmissive material, and the second medium (having refractive index $n_2$) is preferably a fluid mixture. Referring to FIG. 9B, the equation for Brewster's angle is:

$$\tan\theta_B = \frac{n_2}{n_1},$$

where it is assumed that $n_1 < n_2$. Brewster's angle of incidence defines where the polarization of the reflected light is maximized due to this reflective principle. Restated, maximum polarization of the reflected light will be obtained whenever $$\theta_B = \tan^{-1}\frac{n_2}{n_1}.$$

A fluidic optical device may take advantage of the above-stated principles by receiving multiple fluids having different indices of refraction (yielding a composite refractive index $n_2$ for the fluid mixture) behind an optically transmissive window having a fixed refractive index ($n_1$), and by positioning a light source relative to the fluidic optical device at a fixed angle approximately equal to Brewster's angle ($\theta_B$). With $n_1$ and $\theta_B$ fixed, the degree of polarization of the reflected light may be controlled by varying $n_2$. Referring to FIG. 9C, a simplified multi-layer fluidic device 220 according to one embodiment has a substantially optically transmissive top layer 221 having a first index of refraction $n_1$ covering a channel 223 containing a fluid having a second index of refraction $n_2$, with the lateral boundaries of the channel 223 defined by a central layer 222 and the lower boundary of the channel 223 defined by a support layer 224. For simplicity, it is assumed that the refractive index of the first layer 221 ($n_1$) is the same as the refractive index of the surroundings (since there is no illustrated refraction of the beam entering or exiting the first layer 221.) In practical terms, a fluidic device and system for providing variable polarization utility may resemble the device 220 depicted in FIGS. 8A–8B. Multiple fluids may be supplied to the device and mixed upstream of a substantially optically transmissive window region. If the first and second fluids have different indices of refraction, then the proportions of the two fluids within the device may be varied over time using supply valves to selectively control the degree of polarization of the reflected light, up to a maximum when Brewster's equation (as stated in FIG. 9B) is true for the particular fluid or fluid mixture ($n_2$). Alternatively (as further described in connection with other embodiments herein), substantially immiscible fluids may be provided in a channel to form one or more discrete fluidic plugs, and those plugs may be moved by various actuation means in or out of the window, thus varying the index of refraction over time to either satisfy or not satisfy Brewster's equation. Thus, a fluidic optical device capable of providing variable polarization utility is provided.

In further embodiments of the invention, devices for performing optical switching are provided. For example, FIGS. 10A–10B diagrammatically illustrate a fluidic optical device 230 according to one embodiment that may be used to selectively manipulate an incident beam 239. The device 230 may be either microfluidic or have channels and chambers of conventional macrofluidic scale. Although the device 230 is illustrated as having six layers 231–236, one or more layers could be combined or integrated. The first layer 231 is preferably fabricated from a substantially rigid material that is substantially optically transmissive of a desired light spectrum. For example, if the desired light spectrum to be used with the device 230 includes the infrared spectrum, then the first layer 231 may be fabricated from quartz. Alternatively, the first layer 231 may be formed from multiple materials, so long as a central region or window above the fluid chamber 240 remains substantially optically transmissive of the desired light spectrum. The second and third layers 232, 233 defined the lateral boundaries of the fluid chamber 240, with their combined thickness defining the approximate thickness of the chamber 240. The second and third layers 232, 233 are preferably formed from rigid-materials, but since these layers 232, 233 preferably do not interact with the incident light, the optical properties of such materials is less significant. The fourth layer 234, which defines the lower boundary of the chamber 240, is preferably formed from a flexible material that is substantially reflective of the incident beam 239. In a preferred embodiment, the fourth layer 234 is composed of a metallic film or foil bonded to a flexible membrane such as latex, although other materials or combinations thereof may be used. Preferably, the reflective material is spray deposited on the flexible material. Alternatively, the reflective materials can be coated in other manners, such as chemical vapor deposition, evaporation, sputtering, dipping, electroplating, or using other coating methods. The fluid chamber 240 preferably contains a fluid that is substantially absorptive of a desired light spectrum. For example, if the desired spectrum is in the near-infrared region (such as is common in several laser applications), then the absorptive fluid may be carbon tetrachloride or carbon disulfide. To the extent that the coating material may be chemically incompatibility with fluid contained in the chamber 240, then a further (preferably optically transmissive) chemical coating may be added to the reflective coating on the fourth layer 234.

The fifth and sixth layers 235, 236 provide a rigid structure for supporting and spacing an actuator 237 an operative distance from the flexible fourth layer 234. The actuator 237 serves to deform the flexible fourth layer 234 upward, thereby displacing fluid contained within the chamber 240. The chamber 240 is preferably in fluid communication with a variable-volume region (such as shown in FIGS. 12A–12B), such as a chamber defined by at least one flexible member, to act as a spring to as to cause fluid to return to the chamber 240 when the actuator 237 is returned to a retracted position. Such a variable-volume region may be located along an external surface of the device 230 to permit volumetric expansion. Preferably, the upper surface 238 of the actuator 237 may deform the flexible fourth layer 234 into the chamber 240 until a central portion of the fourth layer 234 physically contacts the inner surface of the first layer 231. Several different types of actuation means may be employed, including, for example, piezoelectric, pneumatic, magnetic, thermoelastic, and other mechanical actuators. Linear or rotary (screw-type) actuators may be used. The actuator 237 may be fully or only partially contained within the device 230. In certain embodiments, the actuator forms part of the fluid network and is sealed within the device. In other embodiments, the actuator is outside of the sealed portion of the device but is in contact with a portion of said device. The actuator moves and in turn moves a portion of said microfluidic device causing an alteration of the fluid inside of the device. In certain embodiments, the actuator movement causes a pressure change within the device, which affects the fluid within. In other embodiments, the actuation forces a change in the geometry of the channels or chambers and fluid within the device, which alters light-fluid interaction in the device.

FIGS. 10A–10B illustrate two different operative states of the fluidic optical device 230. FIG. 10A shows the device 230 with the actuator 237 in a retracted position, such that the fluidic chamber 240 is filled with a substantially absorptive fluid. When an incident beam 239 is provided to the device 230, the beam 239 penetrates the substantially optically transmissive window in layer 231 to be absorbed by the fluid in the chamber 240. FIG. 10B shows the device 230 with the actuator 237 in an extended position, such that it deforms the flexible membrane 234 into the fluid chamber 240, thus displacing fluid from the chamber 240. With fluid displaced from the chamber 240, the incident beam 239 can penetrate the window in layer 231 and interact with the flexible membrane 234. The reflective surface of the flexible membrane 234 causes the incident beam 239 to reflect, generating a reflected beam 242. If the fluidic optical device 230 is positioned in an optical path between a light source and light receiver (not shown), then operation of the device 230 permits light to be intermittently provided to the receiver. The fluidic optical device 230 may also be integrated in an optical switching system. In a highly similar alternative embodiment, a device may be constructed with a flexible membrane having an absorptive coating and with a fluidic chamber filled with a reflective fluid (such as mercury).

While the device illustrated in FIGS. 10A–10B employed a flexible membrane separating an actuator from a fluid, a highly similar device according to one embodiment may be constructed without such a membrane. Referring to FIGS.11A–11B, a fluidic device 250 according to a further embodiment is constructed from multiple layers 251–255 and defines an internal chamber 257 bounded by an actuator 256. Preferably, the actuator 256 is capable displacing fluid from the chamber 257 to the point that the actuator 256 contacts the optically transmissive first layer 251. The actuator 256 preferably has a reflective surface 256A, and the liquid within the chamber 257 is preferably substantially absorptive of a light spectrum of interest. If the spectrum of interest is the visible region, then the reflective surface may be metallic, and the absorptive liquid may be a black-colored dye. For instance, the surface of the actuator could be coated with a highly reflective material, such as evaporated gold or other metal. FIG. 11A shows the device 250 with the actuator 256 in a retracted position, such that the fluidic chamber 257 is filled with a substantially absorptive fluid. When an incident beam 258 is provided to the device 250, the beam 258 passes through the substantially optically transmissive window in the first layer 251 and is absorbed by the fluid. FIG. 11B shows the device 250 with the actuator in an extended position, with the absorptive fluid displaced from the chamber 257 so that the incident beam 258 will be reflected against the actuator surface 256A to form a reflected beam 259. If positioned in an optical path between a light source and light receiver (not shown), the device 250 thus provides another apparatus for intermittently providing light to the receiver. In an alternative embodiment, a reflective fluid may be used and the actuator 256 may have an absorptive surface 256A. For example, if the spectrum of interest is the visible region, then the fluid may be mercury and the actuator may be coated with carbon black (with or without a substantially optically transmissive sealant).

As an alternative to the embodiments illustrated in FIGS. 10A–10B and 11A–11B, a flexible member within a fluidic optical device may be deformed remotely by fluid pressure, without direct between an actuator and the flexible member adjacent to the fluid-light interface chamber. Referring to FIGS. 12A–12D, a fluidic optical device 260 according to a further embodiment defines a fluidic optical chamber XX bounded by a flexible material XX and is constructed in multiple layers 261–267. The fluidic optical chamber 268 contains a fluid that is preferably substantially absorptive of a desired light spectrum. On the other side of the flexible material 265 is a central fluidic actuation chamber 269. Pressure variations in the actuation chamber 269 cause deformation of the flexible material 265, which affects the volume of the fluidic optical chamber 268. The actuation chamber 269 contains a fluid, preferably a relatively incompressible liquid. In alternative embodiments, compressible fluids may be used. Preferably, the variations in fluid pressure in the central actuation chamber 269 are capable of deforming the flexible layer 265 until a central portion of the flexible material 265 contacts the inner surface of the first layer 261. In the embodiment shown, the flexible member 265 preferably is formed from or coated with a material that is substantially reflective of a desired light spectrum.

Pressure within the central actuation chamber 269 may be manipulated with one or more actuators 270, 271 in fluid communication with the fluid contents of the actuation chamber 269 by way of fluid channels 271 and lateral actuation chambers 272, 273. Operation of an actuator 270, 271 causes it to deform a flexible member 262 into a lateral actuation chamber 272, 273, thus displacing fluid through a fluid channel 271 and ultimately displacing flexible membrane 265 at the boundary of the central actuation chamber 269. Preferably, the actuators 270, 271 are capable of deforming the flexible member 265 along the central actuation chamber 269 until a central portion of the flexible member 265 physically contacts the inner surface of the first layer 261. Several different types of actuation means may be employed, including for example piezoelectric, pneumatic, magnetic, thermoelastic, or other mechanical actuators.

Operation of the device 260 may proceed similarly to the operational modes described in connection with FIGS. 10A–10B and 11A–11B. The fluidic optical chamber 268 may be initially filled with an absorptive fluid to cause an incident beam 274 to be absorbed, as depicted in FIGS. 12A and 12C. As illustrated in FIGS. 12B and 12D, upon actuation, the flexible member 265 is deformed into the fluidic optical chamber 268 to displace its fluidic contents. At least a portion of the fluid from the optical chamber 268 is displaced into a variable volume overflow chamber 275, 276, which is bounded by a flexible member 262 so as to provide spring action to return the fluid to the optical chamber 268 when the actuator 270, 271 returns to the retracted position. With at least some of the fluid displaced, the absorptive flexible member 265 may contact the substantially transmissive window portion 261A and interact with the incident beam 274 to reflect the beam, producing a reflected beam 277. When the actuators 270, 271 return to the unretracted position, pressure within the actuation chamber 269 is diminished, fluid in the overflow chamber 275, 276 is returned to the fluidic optical chamber 268, and the flexible member 265 returns to a relaxed state.

Several variations to the device 260 illustrated in FIGS. 12A–12D are possible. Referring to FIGS. 13A–13B, a fluidic optical device 280 constructed from multiple layers 281–286 may include actuators 288, 289 placed so as to directly contact a pressure-conveying fluid according to a further embodiment of the invention. For example, piezoelectric actuators may be placed at least partially within the lateral actuation chambers 290, 291. To the extent that actuators are limited by relatively short travel, relatively large actuators 288, 289 may be used to harness hydraulic advantage. That is, if large actuators are selected and placed within lateral actuation chambers having fluid areas much larger than the central actuation chamber 292, then a relatively small actuator displacement will translate into a larger displacement by the central portion of the flexible member 284A into the fluidic optical chamber 287. In another embodiment, the fluidic optical chamber 287 may be initially filled with a substantially reflective fluid and the flexible member 284A may be formed from, or coated with, a substantially absorptive material. In this manner, a reflected beam 294 may be selectively generated from an incident beam 293 In another alterative embodiment, pressure within the actuation chamber 292 may be manipulated by fluid connection and control of an external pressure source rather than by on-board actuators. Connection to an external vacuum source may also be provided. Control of the pressure and/or vacuum source may be provided by external or on-board valves.

Fluidic optical devices according to the present invention may be advantageously controlled with a controller. Referring to FIG. 14, a fluidic optical system 300 is provided for controlling various aspects of a fluidic optical device 301 that interacts with a light beam. A controller 302 may receive and/or provide signals to various devices. The controller 302 preferably includes an associated power supply (not shown). In preferred embodiments, the controller 302 is microprocessor-based and may be located either on a fluidic device 301 or remotely. Other controller types may be used. A fluidic device 301 may have an associated actuator 303 for manipulating one or more fluid within the device 301, with the actuator 301 in communication with the controller 302. Whether or not in conjunction with the actuator 303, a fluidic device 301 may receive fluidic inputs from one or more fluid reservoirs 304, 305. Control of fluid inputs to the fluidic device 301 may be provided by control valves 306, 307 associated with the reservoirs 304, 305 and in communication with the controller 302. The control valves 306, 307 may provide either intermittent (on-off) flow or regulated flow to the fluidic device 301. One or more sensors 308 may be associated with the fluidic device 301 and communicate with the controller 302. These sensors 308 may provide feedback to the control system to optimize control strategies. One or more fluids or fluid mixtures passing through the fluidic device 301 may be provided either to a drain 310 or to a fluid separation I processing device 311, with control of the fluid destination provided by a three-way valve 312 in communication with the controller 302. Following separation and/or processing in the fluid separation/processing device 311, fluids may be returned to the fluid reservoirs 304, 305 for recirculation to the fluidic device 301. At least one light source 313 and light receiver 314 subject to control by the controller 302 may interact with the fluidic device 301. The controller 302 may be in further communication with a display 315 for providing data and information to the user. Additionally, a data storage device 316 and printer 317 may be in communication with the controller 302 to provide archiving and printing utility.

Figure 15A:
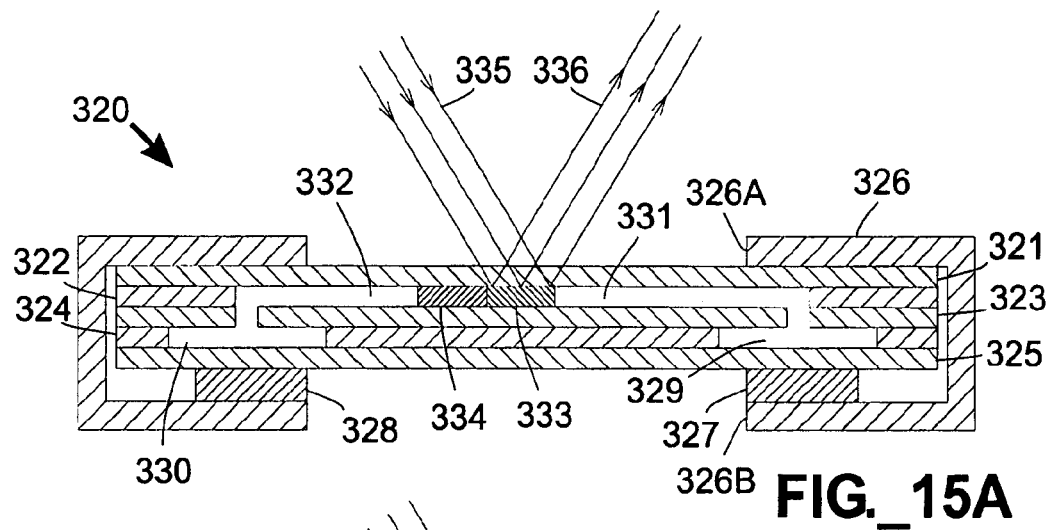
FIGS. 15A–15C are cross-sectional diagrammatic views of a fluidic optical device for selectively manipulating an incident beam of light with multiple discrete internal fluid plugs in a fluid channel.
Figure 15B:
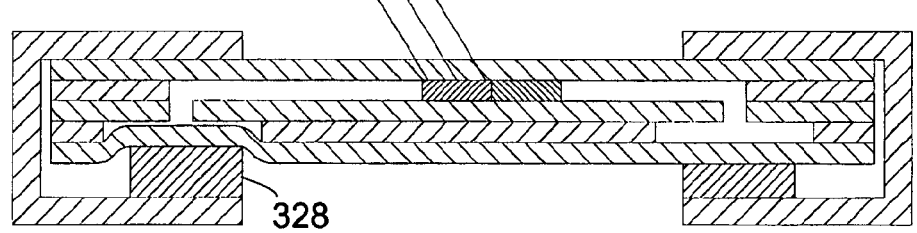
Figure 15C:
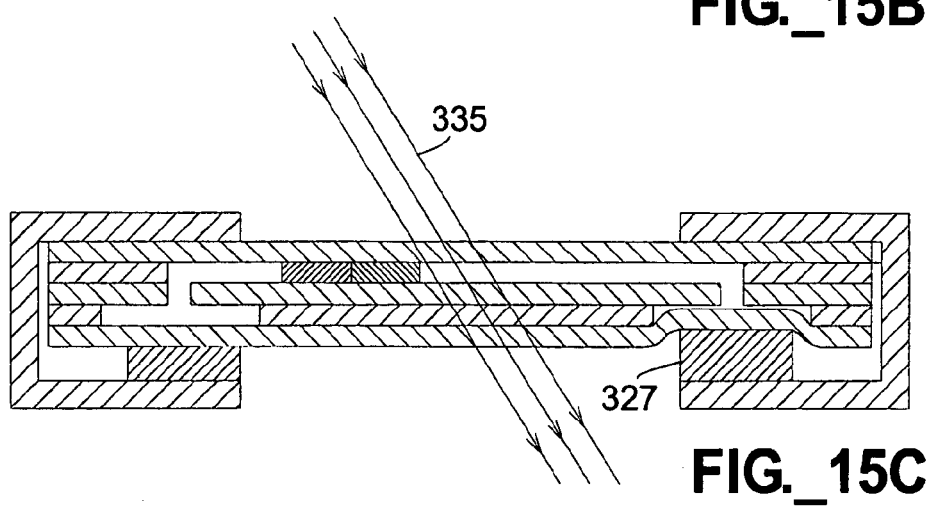

In further embodiments directed to optical switching, one or more fluid plugs may be contained in a fluidic device and manipulated to affect fluidic interaction with a light beam. Referring to FIGS. 15A–15C, a fluidic optical device 320 according to one embodiment may be fabricated in multiple layers 321–325. A rigid surround 326 supports actuators 327, 328 in position against the bottom layer 325. Notably, the surround 326 defines cutout portions 326A, 326B along its top and bottom surfaces to permit light to pass not only into but also through the device 320. Preferably, the multiple device layers 321–325, or at least the central portions thereof within the cutout portions of the surround 326, are fabricated from materials that are substantially optically transmissive for a particular spectrum of interest. For example, glass, silicon, or polymeric materials may be used for visible and certain other spectral bands. Quartz or other materials can be used to pass light in the infrared band. The fluidic device 320 defines two actuation chambers 329, 330 in fluid communication with a plug channel 331. Each actuation chamber 329, 330 is bounded by a flexible material 325 against which an actuator 327, 328 is positioned to control movement of fluid within the plug channel 331. Preferably, each actuation chamber 329, 330 has a larger area than that of the plug channel 331 to amplify actuator travel by principles of hydraulic advantage. While piezoelectric actuators may be advantageously employed to facilitate rapid actuation, actuators of various other types may be used, including, for example, pneumatic, magnetic, thermoelectric, or other mechanical actuators.

The plug channel 331 contains a plurality of fluids that are preferably substantially immiscible. Where dimensions of the plug channel 331 are relatively small, and particularly when the plug channel 331 is of microfluidic dimensions, the immiscible liquids will define at least one discrete fluid plug. Notably, however, miscible liquids may be operatively used in certain microfluidic embodiments. In the embodiment shown in FIGS. 15A–15C, two discrete, adjacent fluid plugs 333, 334 are contained within a bulk third fluid 332. Examples of immiscible fluids that may be used to define such plugs include water, hydrocarbons (oils), organic solvents, and mercury. Preferably, fluids are selected with regard to the particular light spectrum of interest to provide one fluid each that is substantially optically transmissive, reflective, and absorptive. For example, in the near-IR region commonly used in laser communications, carbon disulfide and carbon tetrachloride are substantially optically transmissive, mercury is substantially reflective, and water is substantially absorptive. In the embodiment illustrated in FIGS. 15A–15C, the bulk fluid 332 is substantially optically transmissive, the first plug 334 is substantially absorptive, and the second plug 333 is substantially reflective.

In operation, an incident beam provided by an external source (not shown) having a fixed position may be manipulated by the device 320 to be selectively received by two different light detectors (not shown), or by no detector at all, depending on the position of fluids within the device 320. In FIG. 15A, the second plug 333, which is reflective, is positioned in the path of an incident beam 335. The incident beam 335 passes through the transmissive first device layer 321 and reflects off of the second plug 333 to generate a reflected beam 336. If a second light detector (not shown) is placed in the path of the reflected beam 336, then this beam can be received by the second detector. In FIG. 15B, the first actuator 328 is extended to deform the flexible material 325 into the first actuation chamber 330, thus displacing fluid within the chamber 330 and moving the plugs 333, 334 within the plug channel 331 to the right. If necessary, the second actuator 327 may be concurrently retracted to permit fluid displaced from the plug channel 331 to flow into the second actuation chamber 329. Translation of the plugs 333, 334 within the plug channel 331 positions the first plug 334 in the path of the incident beam 334. Because the first plug 334 is absorptive, the incident beam 335 is absorbed by the plug 334. Finally, in FIG. 15C, the second actuator 327 is extended to deform the flexible material 325 into the second actuation chamber 329, thus displacing fluid within the chamber 329 and moving the plugs 333, 334 within the plug channel 331 to the left. Translation of the plugs 333, 334 sufficiently to the right permits the bulk fluid 332 to be placed in the path of the incident beam 335. Since the bulk fluid 332 is substantially optically transmissive, the incident beam 335 passes completely through the device 320. If a first light detector (not shown) is placed in the path of the unreflected incident beam 335, then this beam can be received by the first detector. Thus, by operating the device 320, an incident beam may be selectively switched to two different detectors.

In an alternative embodiment to provide optical switching utility, substantially immiscible fluids with different indices of refraction may be supplied to the device 320 according to FIGS. 15A–15C. In operation, multiple detectors (not shown) may be positioned opposite the device 320 from a light source (not shown), and the position of fluid plugs having different refractive indices may be manipulated using actuators to selectively provide the (refracted) incident beam to different detectors.

While the preceding example utilized actuators to move fluids within a fluidic optical device, in an alternative embodiment electrokinetic or electroosmotic flow maybe induced to move fluids within such a device. In such an embodiment, electrodes placed in contact with fluid in an optical device and used to generate electric fields that induce fluids to move.

In further embodiments of the present invention, multiple fluidic channels containing fluid plugs may be superimposed to provide optical switching utility. Referring to FIGS. 16A–16B, a multi-layer fluidic optical device 350 is constructed according to one embodiment, with at least a portion (and preferably all) of each layer fabricated from substantially optically transmissive materials. Glass and silicon materials may advantageously be used. The first layer 351 provides two vias 354 penetrating therethrough for communicating fluid with a first channel 355 defined in the upper surface 357 of the second layer 352. Further included in the second layer 352 is a second channel 356 defined in the lower surface 358. Preferably, the first channel 355 and the second channel 356 overlap at least in part to permit an incident beam to penetrate both the first and second channels 355, 356. The second channel 356 is in fluid communication with two vias 359 defined through the third layer 353.

In operation, fluids are provided to the first channel 355 and the second channel 356 to define at least one discrete fluid plug (not shown) in each channel. Preferably, the fluids are substantially incompressible. Various combinations of optically transmissive, absorptive, and reflective fluids, along with fluids of different refractive indices, may be used, with selection of particular fluids depending on the particular light spectrum of interest to be provided to the device 350. Actuation means (such as shown in FIGS. 15A–15B) may be provided to manipulate the position of the plugs within the channels 355, 356. Providing multiple superimposed channels 355, 356 each containing fluid plugs that may be selectively positioned permits complex optical switching schemes to be performed, such as will be discussed in further detail in connection with FIGS. 18A–18B. The device according to FIGS. 16A–16B is particularly amenable to construction by materials such as glass and silicon using conventional semiconductor industry fabrication techniques including etching. External devices including actuators may be attached to the central layers 351–353, and the central layers 351 may be attached to one another, by way of various conventional techniques including adhesive, chemical, or thermal bonding or mechanical attachment.

Further embodiments of the present invention directed to optical switching utility may include more than two superimposed channels. Referring to FIGS. 17A–17B, a multi-layer fluidic optical device 370 is constructed according to one embodiment. Starting with the bottom, the first layer 371 defines three pairs of vias 375, 376, 377 therethrough for communicating fluid to the device 370. The second layer 372 includes a first fluid channel 378 defined in its lower surface 372A along with two pairs of vias 379, 380 penetrating through the layer 372 for providing fluid communication with further layers of the device 370. The third layer 373 includes a second fluid channel 381 defined in its lower surface 373A and one pair of vias 382 for communicating with a third channel 383 defined in the lower surface 374A of the fourth layer 374. When assembled, such as shown in sectional view in FIG. 17B, the three independent fluidic channels 378, 381, 383 may be superimposed over one another for manipulating a beam of light.

In operation, fluids are provided to the first, second, and third channels 378, 381, 383 to define at least one discrete fluid plug (not shown) in each channel. As before, various combinations of fluids having distinct optical transmissive, absorptive, reflective, and refractive properties may be used, with selection of particular fluids depending on the particular light spectrum of interest to be provided to the device 370. Actuation means (such as shown in FIGS. 15A–15B) may be provided to manipulate the position of the plugs within the channels 378, 381, 383. The device 370 according to FIGS. 17A–17B is also particularly amenable to construction by materials such as glass and silicon, further utilizing conventional techniques for bonding the various layers of the device 370, both internally and to external structures such as actuators.

FIGS. 18A–18D schematically illustrate the operation of a multi-channel fluidic optical switching device 400 capable of selectively switching a beam from one light source 401 to any of four different receivers 402, 403, 404, 405 according to one embodiment. Two plug channels 406, 407 each contain at least one fluid plug 408, 409, defined by at least two immiscible fluids. In the particular embodiment illustrated in FIGS. 18A–18D, the plugs 408, 409 are optically reflective of the light spectrum emitted by the light source 401, and the bulk fluids 410, 411 are substantially optically transmissive. Additionally, the device layers are preferably fabricated from optically transmissive materials such as glass or polycarbonate. The positions of the fluid plugs 408, 409 may be manipulated by external actuators (not shown). The plug channels 406, 407 may be advantageously superimposed so as to provide two channels in the path of an incident beam 412 supplied by the light source 401. In FIG. 18A, the plugs 406, 407 within the channels 406, 407 are both positioned away from the path of the incident beam 412, thus permitting the beam 412 to pass substantially unimpeded from the light source 401 to a first light receiver 402. In FIG. 18B, the first reflective plug 408 located in the upper channel 406 is positioned in the path of the incident beam 412, thus generating a reflected beam 413 to be received by the fourth receiver 405. The incident beam 412 may interact with more than one plug, as shown in FIG. 18C. In FIG. 18C, the first plug 408 is positioned above the second plug 409 in such a configuration as to cause the incident beam 412 to reflect first against the first plug 408, then to reflect against the second plug 409, and finally to be received by the second receiver 403. In FIG. 18D, the first and second plugs 408, 409 are positioned such that the incident beam 412 reflects only against the second plug 409 to be received by the third receiver 404. In this manner, light from a single source 401 can be selectively switched to any of four different receivers 402, 403, 404, 405.

In alternative embodiments similar to that depicted in FIGS. 18A–18D, more complex control schemes may be employed. In one embodiment, multiple fluid plugs having different optical properties may be provided in at least one fluid channel, such as illustrated in FIGS. 15A–15C. In another embodiment, more than two plug channels may be superimposed, such as illustrated in FIGS. 17A–17B.

In another embodiment, a fluidic optical element is incorporated into an optical processing system. Referring to FIG. 19, an optical processing system 420 according to one embodiment is provided. An optical apparatus 421 preferably receives an input from a light source 422 and provides a processed beam to an output device 423. The apparatus 421 preferably includes an input coupler 424 for receiving light from the input source 422. In a preferred embodiment the input source 422 provides a monochromatic beam, such as from a laser. The light source may provide a time-dependent beam, such as a pulsed train, or a continuous beam. The input coupler 424 is preferably optically coupled to a first optical element 425. "Optically coupled" in this context means that an optical signal is transmitted from the coupler 424 to the first optical element 425, whether directly or indirectly (e.g. through one or more intermediate components). The first optical element 425 is further optically coupled to a fluidic optical device 426, which may embody any one or more of the several fluidic optical devices disclosed herein. The fluidic optical device 426 may be further optically coupled to a second optical element 427, which can manipulate a light beam before providing it to the an output coupler 428. The fluidic optical device 426 is preferably a microfluidic device, although macrofluidic devices may be used. The first and the second optical element 425, 427 may include one or more of the following: a lens, an optical filter, a collimator, a mirror, and a beam splitter. Notably, however, the first and second optical elements 425, 427 may not be necessary, in which case the fluidic optical device 426 would be optically coupled between the input coupler 424 and the output coupler 428. The output coupler 428 provides an interface between the optical apparatus 421 and an output device 423. The input coupler 424 and output coupler 428 may include physical connectors, such as, for example, fiber optic connectors. Sensors 431 may be utilized with the various components 424–428 of the apparatus 421 or the light source 422 or output device 423 to provide signals, including feedback signals, to a controller 430 that may control various aspects of the apparatus 421. The controller 430 is powered with a power supply 432 and preferably provides information to a user interface 433. The system 420 may be utilized in a number of applications, including optical signal processing or manipulation and optical switching.

The particular devices, construction methods, and fluid manipulation methods illustrated and described herein are provided by way of example only, and are not intended to limit the scope of the invention, which should be restricted only in accordance with the appended claims and their equivalents.

What is claimed is:

1. A microfluidic optical system comprising:
    a light source;
    a light receiver;
    a microfluidic device for altering, by light-fluid interaction, the nature of a light beam emitted by the light source, the device having a window that is substantially transmissive of a desired light spectrum and containing a plurality of fluids behind the window, the window being disposed in an optical path between the light source and the light receiver to permit light-fluid interaction;
    means for repeatedly manipulating the proportion of at least one of the plurality of fluids optically disposed between the light source and light receiver, wherein the manipulation affects reflection, refraction, absorption, optical filtering, or scattering of the light beam by at least one of the plurality of fluids; and
    a mixer for substantially mixing at least two of the plurality of fluids, wherein the light beam interacts with the resulting mixture.

2. A microfluidic optical system comprising:
a light source;
a light receiver;
a microfluidic device for altering, by light-fluid interaction, the nature of a light beam emitted by the light source, the device having a window that is substantially transmissive of a desired light spectrum and containing a plurality of fluids behind the window, the window being disposed in an optical path between the light source and the light receiver to permit light-fluid interaction; and
means for repeatedly manipulating the proportion of at least one of the plurality of fluids optically disposed between the light source and light receiver, wherein the manipulation affects reflection, refraction, absorption, optical filtering, or scattering of the light beam by at least one of the plurality of fluids;
wherein the plurality of fluids includes a first fluid and a second fluid, the fluids being substantially immiscible and defining a discrete plug of the first fluid, and
wherein the manipulation means includes a deformable flexible member in fluid communication with the first fluid plug.

3. The system of claim 2 wherein the flexible member is deformed by means selected from the group consisting of: piezoelectric actuation, magnetic actuation, pneumatic actuation, thermoelectric actuation, and mechanical actuation.

4. The system of claim 2 wherein the first fluid and the second fluid are both liquids.

5. The system of claim 1 wherein at least one of the plurality of fluids contains dissolved or suspended particles.

6. A variable optical filter including the optical system of claim 1.

7. An optical switching device including the optical system of claim 2.

8. A method for performing optical switching, the method comprising the steps of:
providing a first light source and a first light receiver;
providing an enclosed microfluidic channel containing a first fluid and a second fluid, the fluids being substantially immiscible and defining a discrete plug of the first fluid; and
manipulating the first fluid plug to selectively enable light emitted from the first light source to be received by the first light receiver;
wherein manipulation of the first fluid plug is performed by deforming a flexible member in fluid communication with the microfluidic channel.

9. A method for performing optical switching, the method comprising the steps of:
providing a first light source and a first light receiver;
providing an enclosed microfluidic channel containing a first fluid and a second fluid, the fluids being substantially immiscible and defining a discrete plug of the first fluid;
providing a plurality of electrodes in electrical communication with at least one of the first fluid and the second fluid; and
supplying an electric potential to at least one electrode of the plurality of electrodes to induce an electrokinetic or electrophoretic pressure gradient within the microfluidic channel to manipulate the first fluid plug to selectively enable light emitted from the first light source to be received by the first light receiver.

10. The method of claim 8 wherein a fluid reservoir having a greater cross-sectional area than the microfluidic channel is in fluid communication with the microfluidic channel, and the flexible member is positioned adjacent to the reservoir.

11. The method of claim 8 wherein the flexible member defines a surface of the microfluidic channel.

12. A method for performing optical switching, the method comprising the steps of:
providing a light source and a light receiver;
providing an enclosed microfluidic channel containing a fluid;
providing a deformable member in fluid communication with the channel, and
deforming the deformable member to displace at least a portion of the fluid contained in the microfluidic channel to selectively enable light emitted from the light source to be received by the light receiver;
wherein the fluid is substantially absorptive of at least a portion of the spectrum to be emitted from the light source, and the deformable member is substantially reflective of at least a portion of the spectrum to be emitted from the light source.

13. The method of claim 12 wherein the deformable member is deformed by piezoelectric actuation or magnetic actuation.

14. An optical switching device utilizing the method of claim 12.

15. A method for altering the nature of a light beam, the method comprising the steps of:
providing an enclosed microfluidic device having a chamber bounded by a deformable flexible membrane, the chamber containing fluid;
supplying a light beam to the microfluidic device in the direction of the flexible membrane; and
manipulating the pressure within the chamber, thereby deforming the flexible membrane and changing the amount of fluid present in the chamber;
wherein the flexible membrane is substantially reflective of a desired light spectrum and at least a portion of the light beam interacts with the membrane.

16. The system of claim 1 wherein the mixer is disposed within a fluidic mixing device.

17. The system of claim 16 wherein the fluidic mixing device includes a microfluidic channel.

18. The system of claim 17 wherein the fluidic mixing device includes a substantially planar stencil layer, the microfluidic channel being defined through the entire thickness of the stencil layer.

19. The system of claim 16 wherein the mixer is adapted to laminate a first fluid of the plurality of fluids in a first fluidic layer in contact with a second fluid of the plurality of fluids in a second fluidic layer.

20. The system of claim 1 wherein the light source has an associated first fiber optic conduit and the light receiver has an associated second fiber optic conduit.

21. The system of claim 1 further comprising a plurality of fluidic inputs for supplying the plurality of fluids to the microfluidic device.

22. The system of claim 1 wherein the manipulating means includes a flow control device that permits the flow rate of at least one fluid of the plurality of fluids to be varied.

23. The system of claim 1 wherein the manipulating means includes at least one pump.

24. The system of claim 1 wherein the microfluidic device comprises a flow-through cell through which the plurality of fluids flow substantially continuously.

25. The system of claim 1 wherein the plurality of fluids includes at least three fluids.

26. The system of claim 1 wherein the plurality of fluids are all liquids.

27. The system of claim 2 wherein the flexible member comprises a polymeric material.

28. The system of claim 2 wherein the microfluidic device comprises a plurality of substantially planar device layers including a stencil layer having a microfluidic channel defined through the entire thickness of the stencil layer.

29. The system of claim 2 wherein at least one of the plurality of fluids contains dissolved or suspended particles.

30. An optical processing system comprising:
   an input light source;
   an input coupler for receiving light from the input light source;
   an output coupler for providing light to an output device;
   a microfluidic optical device for manipulating light, the microfluidic optical device comprising a plurality of substantially planar device layers including a stencil layer having a microfluidic channel defined through the entire thickness of the stencil layer, the microfluidic optical device further being optically coupled between the input coupler and the output coupler;
   an output device for receiving a beam from the output coupler;
   a controller;
   a power supply; and
   a sensor, wherein the controller receives a feedback signal from the sensor.

31. An optical switching device including the optical system of claim 30.

32. The system of claim 30 wherein the sensor comprises at least one sensor.

33. The system of claim 32 wherein the at least one sensor is disposed in sensory communication with the microfluidic optical device.

34. The system of claim 32 wherein the at least one sensor is disposed in sensory communication with any of the input coupler and the output coupler.

35. The system of claim 32 wherein at least one sensor is disposed in sensory communication with any of the input light source and the output device.

36. The system of claim 30 wherein the input source provides a monochromatic beam.

* * * * *

UNITED STATES PATENT AND TRADEMARK OFFICE
CERTIFICATE OF CORRECTION

| | | |
|---|---|---|
| PATENT NO. | : 7,027,683 B2 | Page 1 of 1 |
| APPLICATION NO. | : 09/931585 | |
| DATED | : April 11, 2006 | |
| INVENTOR(S) | : Stephen D. O'Connor et al. | |

It is certified that error appears in the above-identified patent and that said Letters Patent is hereby corrected as shown below:

On title page (56) in the References Cited: Foreign Patent Documents section, page 2, first column, add

-- WO  WO 99/43059  8/1999 --

Column 13, line 15, "FIGS. 8C-4D" should be -- FIGS. 8C-8D --

Signed and Sealed this

Twenty-first Day of November, 2006

JON W. DUDAS
*Director of the United States Patent and Trademark Office*